US006958798B2

(12) United States Patent
Fujii et al.

(10) Patent No.: US 6,958,798 B2
(45) Date of Patent: Oct. 25, 2005

(54) LIQUID CRYSTAL DISPLAY DEVICE

(75) Inventors: Akiyoshi Fujii, Nara (JP); Tadashi Kawamura, Tenri (JP); Yuichiro Yamada, Nagoya (JP)

(73) Assignee: Sharp Kabushiki Kaisha, Osaka (JP)

( * ) Notice: Subject to any disclaimer, the term of this patent is extended or adjusted under 35 U.S.C. 154(b) by 81 days.

(21) Appl. No.: 10/313,035

(22) Filed: Dec. 6, 2002

(65) Prior Publication Data

US 2003/0123004 A1 Jul. 3, 2003

(30) Foreign Application Priority Data

Dec. 7, 2001 (JP) ....................................... 2001-374457

(51) Int. Cl.$^7$ ............................................. G02F 1/1337
(52) U.S. Cl. ...................................................... 349/123
(58) Field of Search ................................ 349/123–126, 349/129, 132–134, 156

(56) References Cited

U.S. PATENT DOCUMENTS 6,069,620 A 5/2000 Nakamura et al.
6,201,592 B1 3/2001 Terashita et al.
6,437,844 B1 8/2002 Hattori et al.
6,597,424 B2 * 7/2003 Hattori et al. .............. 349/146

FOREIGN PATENT DOCUMENTS

EP 1 124 153 A2 8/2001
EP 1 130 455 9/2001
JP 09-096790 4/1997

OTHER PUBLICATIONS

International Search Report mailed Jul. 8, 2004.

* cited by examiner

*Primary Examiner*—Tarifur R. Chowdhury
*Assistant Examiner*—Thoi V. Duong
(74) *Attorney, Agent, or Firm*—Nixon & Vanderhye P. C.

(57) ABSTRACT

A liquid crystal display device includes a first substrate, a second substrate placed to face the first substrate, and a liquid crystal layer interposed between the first and second substrates. The liquid crystal layer further includes: a splay-aligned region in which a transformation from splay alignment to bend alignment or from bend alignment to splay alignment occurs according to a voltage applied; and a nucleation region serving as a nucleation site for initiating the transformation to occur in the splay-aligned region. A plurality of first splay-aligned regions include two first splay-aligned regions connected to each other via one of a plurality of second splay-aligned regions.

14 Claims, 19 Drawing Sheets

LIQUID CRYSTAL DISPLAY DEVICE

BACKGROUND OF THE INVENTION

The present invention relates to a liquid crystal display device, and more particularly, to a liquid crystal display device using bend alignment of liquid crystal molecules for effecting display.

In recent years, active matrix liquid crystal display devices have dramatically improved in display performance such as contrast, brightness and viewing angle characteristic, to a level as high as that of cathode ray tubes (CRTs). The liquid crystal display mode currently used widely is a twisted nematic (TN) mode having a response time in the order of tens of milliseconds. With this level of response speed, which is low compared with that of CRTs, blurring occurs when a moving image with vigorous motion such as that in sports is displayed. The causes of this blurring of a moving image were studied in depth by Ishiguro, Kurita and others (Shuichi Ishiguro, Taiichiro Kurita, "Study on moving image quality of hold emission type display with 8X CRT", ITE Technical Report, IDY96-93, BCS96-23, BFO96-50).

According to the literature described above, the deterioration of the moving image quality of a liquid crystal display device is caused by delay of the response time of a liquid crystal material with respect to the frame rate and by adopting hold type display as the display scheme. The hold type display can be changed to impulse type display by letting a backlight blink or inserting screen erase intervals for the display with liquid crystal. As for the delay of the response time, mainly two measures as follows have been proposed.

One is a surface stabilized ferroelectric liquid crystal (SSFLC) mode using ferroelectric liquid crystal proposed by Clark and Lagerwall in 1980. This mode is however disadvantageous in that the way of gray scale display is complicated and that the alignment stability of smectic liquid crystal is inferior. Due to these and other disadvantages, commercialization of this mode, once started by Cannon Inc., is presently discontinued.

The other is a pi-cell approach using nematic liquid crystal invented by J. P. Bos and others in 1983. In this approach, a voltage is applied across a splay-aligned liquid crystal layer to transform the splay alignment to bend alignment, and a change in retardation with the intensity of the voltage application in the bend-aligned state is used for display. In this display mode, only liquid crystal molecules in the surface portion of the liquid crystal layer move with application of an external field, and a backflow generated in the process of relaxation of the alignment serves to accelerate the response. Due to these features, high-speed response of several milliseconds is reportedly possible.

In the pi-cell approach described above, splay alignment is energetically more stable than bend alignment in the non-voltage applied state. For this reason, some methods for transforming splay alignment to bend alignment have been proposed.

For example, U.S. Pat. No. 6,069,620, discloses a method in which an intense voltage is applied at the start of operation to allow liquid crystal molecules to overpass the energy barrier and thus be transformed to bend alignment. Japanese Laid-Open Patent Publication No. 11-7018 discloses a method in which a high pretilt region is formed on a surface of at least one of a pixel electrode and a counter electrode. Using the high pretilt region as a nucleation site, a liquid crystal layer is transformed to bend alignment, with expansion of disclination, during voltage application.

Japanese Laid-Open Patent Publication No. 9-96790 discloses the following. By adding a chiral dopant to a nematic liquid crystal material so that $d/p>0.25$ is satisfied (where d is the thickness of a liquid crystal cell and p is a pitch of a spontaneous helical structure of the liquid crystal material with the chiral dopant mixed therein), the liquid crystal layer exhibits 180-degree twisted alignment in the non-voltage applied state. When a voltage is applied to this twisted liquid crystal layer, the twisted alignment is smoothly transformed to bend alignment without generation of disclination.

The three methods described above have been mainly proposed in relation with the transformation of the liquid crystal layer from splay alignment to bend alignment. These conventional methods however find difficulty in attaining sufficiently swift transformation from splay alignment to bend alignment and also reliable transformation over the entire display plane.

The present inventors examined use of a 180-degree twisted region as a nucleation site. However, it was found difficult to form a 180-degree twisted region stably and reliably. In fact, part of the region failed to be 180-degree twisted, but splay-aligned.

An object of the present invention is providing a liquid crystal display device capable of attaining swift and reliable transformation from splay alignment to bend alignment or from bend alignment to splay alignment.

SUMMARY OF THE INVENTION

The liquid crystal display device of the present invention includes a first substrate, a second substrate placed to face the first substrate, and a liquid crystal layer interposed between the first and second substrates, wherein the liquid crystal layer includes: a splay-aligned region in which a transformation from splay alignment to bend alignment or from bend alignment to splay alignment occurs according to a voltage applied; and a nucleation region serving as a nucleation site for initiating the transformation to occur in the splay-aligned region, the nucleation region includes a plurality of first nucleation regions, each of the plurality of first nucleation regions extending in a first direction, and a plurality of second nucleation regions, each of the plurality of second nucleation regions extending in a second direction different from the first direction, the splay-aligned region includes a plurality of first splay-aligned regions having a first width in the second direction and a plurality of second splay-aligned regions having a second width smaller than the first width in the second direction, and the plurality of first splay-aligned regions include two first splay-aligned regions connected to each other via one of the plurality of second splay-aligned regions.

The liquid crystal layer may contain a chiral dopant, the nucleation region may be a twist-aligned region exhibiting 180-degree twisted alignment during non-voltage application, the plurality of first nucleation regions may be a plurality of first twist-aligned regions exhibiting 180-degree twisted alignment during non-voltage application, and the plurality of second nucleation regions may be a plurality of second twist-aligned regions exhibiting 180-degree twisted alignment during non-voltage application.

Preferably, $d1/p$ of the twist-aligned region is greater than $d2/p$ of the splay-aligned region where p is a pitch of the liquid crystal material with a chiral dopant, d1 is a thickness of the twist-aligned region of the liquid crystal layer, and d2 is a thickness of the splay-aligned region of the liquid crystal layer.

Preferably, d1 is greater than d2.

Preferably, the first substrate includes a plurality of gate lines extending in the first direction, a plurality of source lines extending in the second direction crossing the first direction, a plurality of switching elements placed in the vicinity of the crossings of the plurality of gate lines and the plurality of source lines, and a plurality of pixel electrodes electrically connected with the plurality of gate lines and the plurality of source lines via the plurality of switching elements, at least one of the plurality of first twist-aligned regions is formed above at least one of the plurality of gate lines, at least one of the plurality of second twist-aligned regions is formed above at least one of the plurality of source lines, and at least one of the plurality of first splay-aligned regions is formed above at least one of the plurality of pixel electrodes.

Preferably, the first substrate further includes a plurality of common lines each formed between the adjacent ones of the plurality of gate lines, and at least one of the plurality of first twist-aligned regions is formed above at least one of the plurality of common lines.

Preferably, at least one of the plurality of second twist-aligned regions is formed continuously from at least one of the plurality of first twist-aligned regions.

The spacing between two second twist-aligned regions adjacent in the first direction among the plurality of second twist-aligned regions is preferably 1 mm or less.

A least one of the first substrate and the second substrate may have a plurality of steps each having an upper face, a lower face, and a side face connecting the upper face and the lower face, and the splay-aligned region may be formed above the upper faces of the plurality of steps, and the twist-aligned region is formed above the lower faces of the plurality of steps.

Preferably, the plurality of steps include a first step and a second step, the side face of the first step has an angle exceeding 90° with respect to the lower face, and the side face of the second step has an angle less than 90°with respect to the lower face.

The side face of the first step preferably extends in the first direction.

The side face of the second step preferably extends in the second direction.

The pretilt direction of liquid crystal molecules of the liquid crystal layer may be parallel to the first direction.

Alternatively, the liquid crystal display device of the present invention includes a first substrate, a second substrate placed to face the first substrate, and a liquid crystal layer interposed between the first and second substrates, the liquid crystal layer containing a chiral dopant, wherein the liquid crystal layer includes: a twist-aligned region exhibiting 180-degree twisted alignment during non-voltage application; and a splay-aligned region exhibiting splay alignment during non-voltage application and bend alignment during voltage application, to be used for display, at least one of the first substrate and the second substrate has a plurality of steps each having an upper face, a lower face, and a side face connecting the upper face and the lower face on the surface facing the liquid crystal layer, the splay-aligned region is formed above the upper faces of the plurality of steps, and the twist-aligned region is formed above the lower faces of the plurality of steps, and the plurality of steps include a first step and a second step, the side face of the first step has an angle exceeding 90° with respect to the lower face, and the side face of the second step has an angle less than 90° with respect to the lower face.

According to another aspect of the invention, a method for forming inverted steps and normal steps simultaneously is provided. Each of the steps has an upper face, a lower face, and a side face connecting the upper face and the lower face. The face of the inverted step has an angle less than 90° with respect to the lower face, and the side face of the normal step has an angle exceeding 90° with respect to the lower face. The method includes the steps of: preparing a substrate having a high-reflectance region on the principal plane, the high-reflectance region being higher in reflectance than the surrounding regions; forming a photosensitive resin layer on the principal plane; and exposing the photosensitive resin layer to light via a mask having a light-shading portion and a light-transmitting portion in a predetermined pattern, to form the inverted steps or the normal steps using reflected light from the high-reflectance region.

The high-reflectance region is preferably a gate line, a source line or a common line formed on the principal plane of the substrate.

The photosensitive resin layer may be a negative type photosensitive resin layer, the mask may be positioned so that the light-shading portion is placed above the high-reflectance region with edges of the light-shading portion being inside the high-reflectance region, and the inverted steps may be formed using the reflected light.

The photosensitive resin layer may be a positive type photosensitive resin layer, the mask may be positioned so that the light-transmitting portion is placed above the high-reflectance region with edges of the light-transmitting portion being inside the high-reflectance region, and the normal steps may be formed using the reflected light.

BRIEF DESCRIPTION OF THE DRAWINGS

FIGS. 21A to 21D are views demonstrating a step formation method using a negative type photosensitive resin layer, in which FIGS. 21A and 21B illustrate formation of inverted steps and FIGS. 21C and 21D illustrate formation of normal steps.

FIGS. 22A to 22D are views demonstrating a step formation method using a positive type photosensitive resin layer, in which FIGS. 22A and 22B illustrate formation of normal steps and FIGS. 22C and 22D illustrate formation of inverted steps.

DETAILED DESCRIPTION OF THE INVENTION

Figure 1:
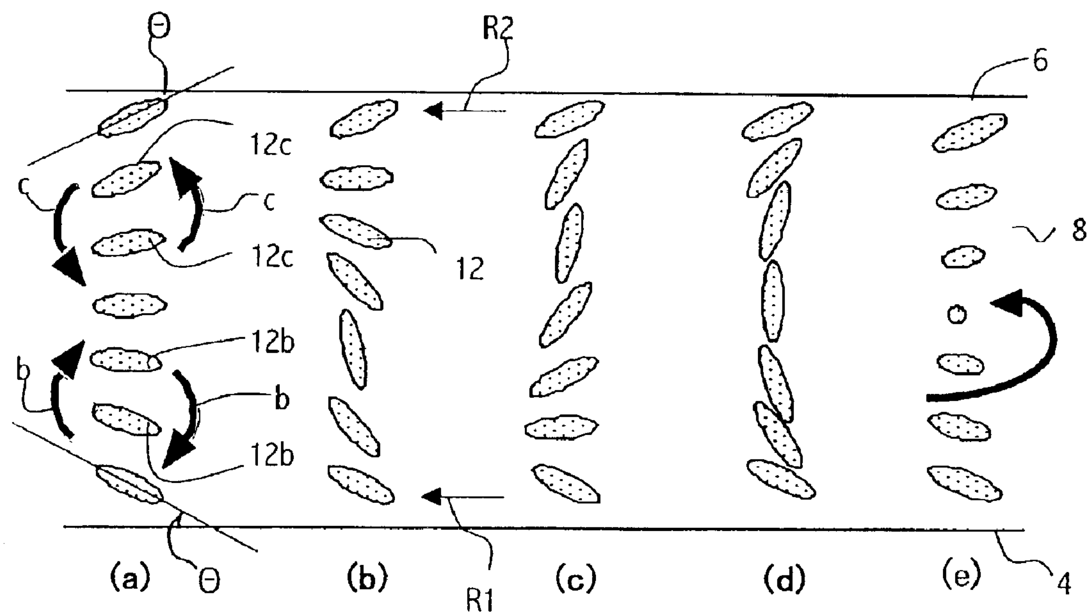
FIG. 1 is a diagrammatic view demonstrating the display principle of the liquid crystal display device of the present invention.

The liquid crystal display device of the present invention is an optically compensated bend (OCB) mode liquid crystal display device, which uses bend alignment of liquid crystal molecules for effecting display and, preferably, can provide both the high-speed response characteristic and the wide viewing angle characteristic. First, the display principle of the liquid crystal display device of the present invention will be described with reference to FIG. 1.

A liquid crystal layer 8, interposed between first and second substrates 4 and 6 facing each other, includes a nematic liquid crystal material (Np material) having positive dielectric anisotropy and a chiral dopant. The directions R1 and R2 of alignment regulation on the surfaces of the substrates 4 and 6 facing the liquid crystal layer 8 are parallel to each other. With the alignment regulating force on the substrate surfaces, which is typically provided by alignment films (not shown), the aligned direction (pretilt direction) of liquid crystal molecules 12 is regulated. The angle θ of the liquid crystal molecules with respect to the substrate surfaces is called a pretilt angle. The liquid crystal layer 8 subjected to the alignment regulation described above exhibits splay alignment (see (a) in FIG. 1) when the pretilt angle is 45° or less. The liquid crystal display device of the present invention uses bend alignment (see (d) in FIG. 1) of the liquid crystal layer for effecting display. Therefore, to attain the bend alignment, the splay alignment is transformed to the bend alignment. Hereinafter, this transformation will be described.

When a voltage is applied to the liquid crystal layer exhibiting splay alignment, the alignment of liquid crystal molecules changes. More specifically, after application of a voltage, the alignment changes to two types of deformed splay alignment. One type is formed by clockwise rotation of liquid crystal molecules 12*b* existing in a half part of the liquid crystal layer 8 closer to the first substrate 4 from the center (this type of alignment is called Hup shortly; see (b) in FIG. 1). The other type is formed by counterclockwise rotation of liquid crystal molecules 12*c* existing in a half part of the liquid crystal layer 8 closer to the second substrate 6 from the center (this type of alignment is called Hdown shortly; see (c) in FIG. 1).

Thereafter, with further influence of the electric field, in the region of Hup alignment (b) of the liquid crystal layer 8, liquid crystal molecules existing in the half part closer to the second substrate 6 are rotated counterclockwise, so that the region is transformed to the bend alignment (d). Likewise, in the region of Hdown alignment (c) of the liquid crystal layer 8, liquid crystal molecules existing in the half part closer to the first substrate 4 are rotated clockwise, so that the region is transformed to the bend alignment (d). In the process of the transformation from the Hup or Hdown alignment to the bend alignment, a ½ strength disclination is generated between the Hup or Hdown alignment and the bend alignment. As this disclination shifts, the bend-aligned region expands.

When the voltage is removed after the transformation to the bend alignment, the liquid crystal molecules do not directly return to the splay alignment, but-exhibit 180-degree twisted alignment as shown by (e) in FIG. 1. This transformation from the bend alignment to 180-degree twisted alignment continuously occurs without generating disclination. On the contrary, transformation from the 180-degree twisted alignment to the splay alignment proceeds gradually with generation of disclination.

Referring to FIG. 1, considering the movement of the liquid crystal molecules during the transformation from the Hup alignment (b) or Hdown alignment (c) to the bend alignment (d), it is understood geometrically that molecules near the interfaces having accumulated distortion are transformed to the bend alignment by rotation. The 180-degree twisted alignment (e) is also transformed to bend alignment as (d) with application of an electric field. However, this transformation from the 180-degree twisted alignment to the bend alignment is different from the splay-bend alignment transformation shown by (a) to (c) in the point that the former is accompanied by twisting.

For the transformation from the Hup alignment (b) or Hdown alignment (c) to the bend alignment, the liquid crystal molecules must rotate around an axis vertical to the plane of the figure, and a large energy is required for this rotation. On the contrary, the transformation from the 180-degree twisted alignment (e) to the bend alignment occurs when the liquid crystal molecules gradually rise vertical to the substrates 4 and 6 while twisting around an axis vertical to the substrates 4 and 6. Thus, the transformation from the 180-degree twisted alignment to the bend alignment is smooth.

In general, when a splay-aligned region is in contact with a bend-aligned region, the splay alignment is transformed to bend alignment in a manner that the contact portion expands with application of a voltage. Therefore, the existence of the bend-aligned region itself is considered a factor for smooth occurrence of the transformation. For the reasons described above, it is presumed that the transformation occurs smoothly by using 180-degree twisted alignment as a nucleation site for transformation.

The present inventors fabricated a liquid crystal cell including a liquid crystal layer having an uneven thickness. An Np liquid crystal material with a chiral dopant mixed therein was injected in the liquid crystal cell, to examine the aligned state. As a result, it was observed that the thick portion of the liquid crystal layer exhibited 180degree twisted alignment while the thin portion thereof exhibited splay alignment. It was also observed that a ½ strength disclination was generated between the splay-aligned region and the 180-degree twist-aligned region.

When a voltage is gradually applied to the liquid crystal cell described above, first, the thick 180-degree twist-aligned region of the liquid crystal layer is transformed bend alignment. Subsequently, the thin splay-aligned region of the liquid crystal layer is transformed to Hup or Hdown splay alignment.

Thereafter, the disclination between the 180-degree twist-aligned region and the Hup or Hdown splay-aligned region starts to shift to the side of the splay-aligned region, transforming the Hup or Hdown splay-aligned region to bend alignment. In this way, the bend-aligned region expands into the splay-aligned region.

As described above, the 180-degree twist-aligned region serves as a nucleation site for transformation of the splay-aligned region to bend alignment, so that the splay-bend alignment in the liquid crystal layer is smoothly attained. Thus, the liquid crystal display device of the present invention uses the 180-degree twist-aligned region as a nucleation site for start of the transformation to bend alignment, and uses the bend alignment for effecting display.

Next, the configuration of the liquid crystal display device of the present invention will be described.

Figure 2A:
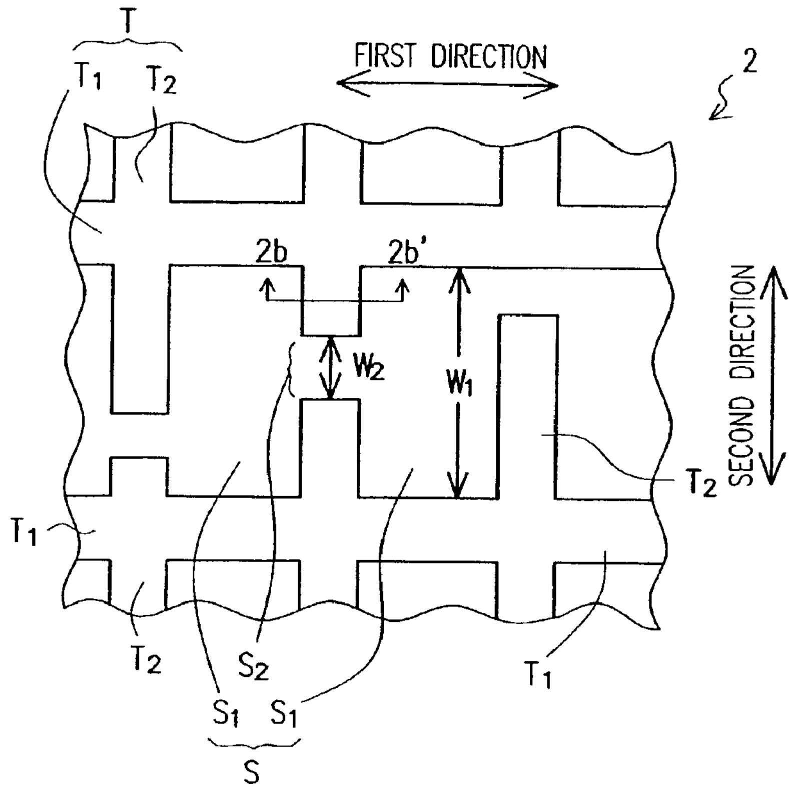
FIG. 2A is a partial plan view of a liquid crystal display device in one aspect of the present invention.
Figure 2B:
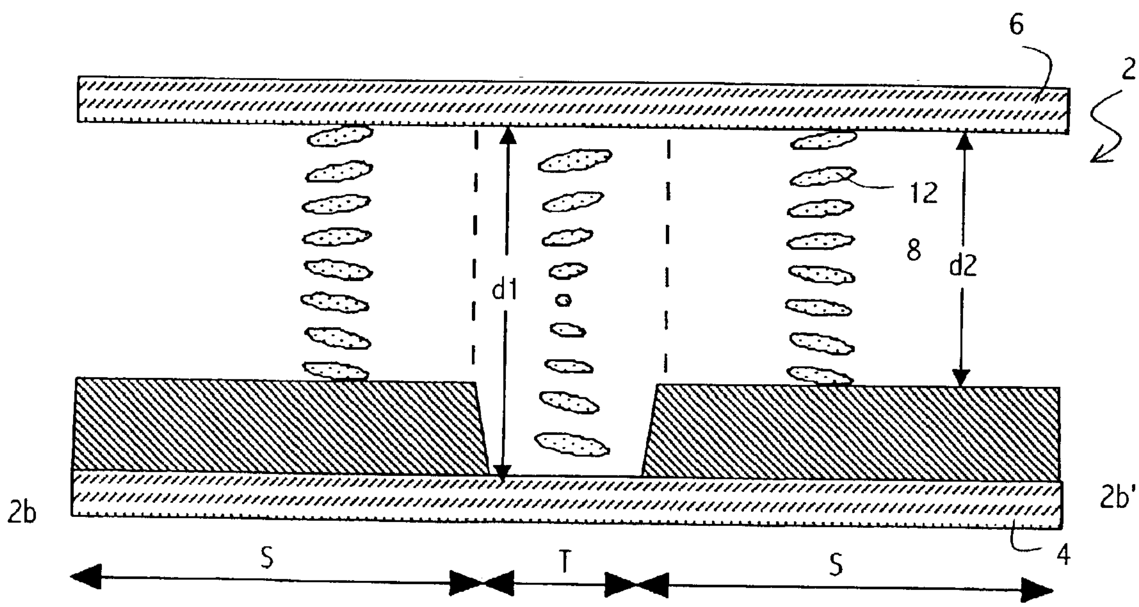
FIG. 2B is a cross-sectional view taken along line 2*b*–2*b*′ of FIG. 2A.

First, a liquid crystal display device 2 in the first aspect of the present invention will be described with reference to FIGS. 2A and 2B. FIG. 2A is a partial plan view of the liquid crystal display device 2, and FIG. 2B is a cross-sectional view taken along line 2*b*–2*b*′ of FIG. 2A. In FIG. 2A, illustration of a second substrate 6 is omitted for simplification.

As shown in FIG. 2B, the liquid crystal display device 2 includes a first substrate 4, the second substrate 6 placed to face the first substrate 4, and a chiral dopant contained liquid crystal layer 8 interposed between the first and second substrates 4 and 6. The liquid crystal layer 8 has a plurality of regions different in thickness, such as a region having a thickness of d1 (region T) and a region having a thickness of d2 (<d1) (region S), for example.

The amount of the chiral dopant mixed in a liquid crystal material is set so that the pitch p of the spontaneous helical structure of the Np material with a chiral dopant and the thickness d2 of the liquid crystal layer in the region S satisfy the relationship $d2/p<0.25$ and that the pitch p of the Np material and the thickness d1 of the liquid crystal layer in the region T satisfy the relationship $0.25 \leqq d1/p \leqq 0.75$. By this setting, the region T exhibits 180-degree twisted alignment, while the region S exhibits splay alignment, during non-voltage application. When a voltage is applied, the region S exhibits bend alignment, which is used for display in the liquid crystal display device 2. The d2/p of the region S is preferably 0.125 or less, more preferably 0.1 or less. With use of a material small in d2/p for the region S, reduction in the brightness of the display area is prevented.

As shown in FIG. 2A, the region T (hereinafter, called the twist-aligned region T) having the thickness d1 includes a plurality of first twist-aligned regions T1 extending in a first direction and a plurality of second twist-aligned regions T2 extending in a second direction. The region S (hereinafter, called the splay-aligned region S) having the thickness d2 includes a plurality of first splay-aligned regions S1 and a plurality of second splay-aligned regions S2. The first splay-aligned regions S1 have a first width W1 in the second direction, and the second splay-aligned regions S2 have a second width W2 smaller than the first width W1 in the second direction. The plurality of first splay-aligned regions S1 include at least two first splay-aligned regions S1 connected to each other via the second splay-aligned region S2.

In the liquid crystal display device 2 in the first aspect of the present invention, the twist-aligned region T and the splay-aligned region S of the liquid crystal layer 8 are formed by adjusting the thickness of the liquid crystal layer 8. The twist-aligned region T is first transformed to bend alignment during voltage application. With the transformed region T serving as a nucleation site, the splay-aligned region S is transformed to bend alignment. The existence of the nucleation site facilitates the transformation of the splay-aligned region S from the splay alignment to bend alignment. Herein, the twist-aligned region T is also called the nucleation site.

In the liquid crystal display device 2 described above, the twist-aligned region T as the nucleation site includes the second twist-aligned regions T2 extending in the second direction, in addition to the first twist-aligned regions T1 extending in the first direction. This enables further swift and reliable transformation of the splay-aligned region S from the splay alignment to bend alignment. The reason will be described as follows with reference to FIGS. 3A and 3B.

Figure 3A:
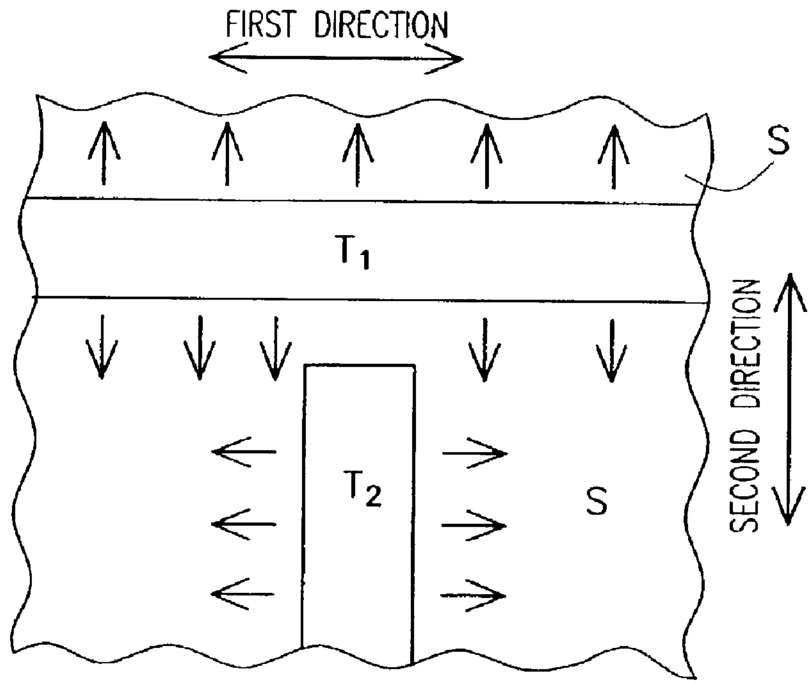
FIGS. 3A and 3B are diagrammatic views demonstrating transformation of the alignment of a liquid crystal layer.
Figure 3B:
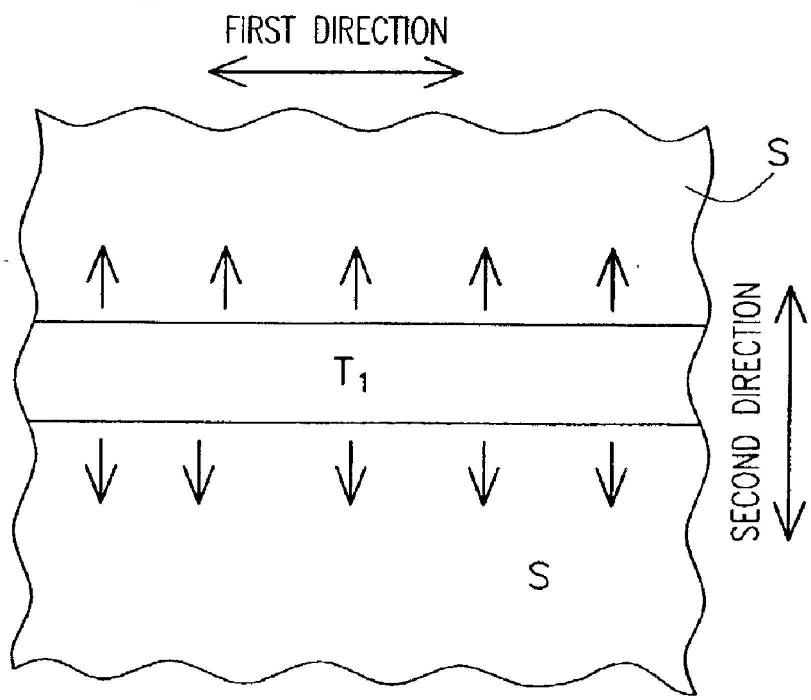

FIGS. 3A and 3B are diagrammatic views demonstrating transformation of the alignment of the liquid crystal layer. The liquid crystal layer shown in FIG. 3A includes the splay-aligned region S, the first twist-aligned region T1 and the second twist-aligned region T2. For comparison, FIG. 3B shows a liquid crystal layer including only the splay-aligned region S and the first twist-aligned region T1.

In the case of FIG. 3A, in which the liquid crystal layer includes the first and second twist-aligned regions T1 and T2, a region subjected to splay-bend alignment transformation expands in the first and second directions using the first and second twist-aligned regions T1 and T2 as the nucleation sites. On the contrary, in the case of FIG. 3B, in which the liquid crystal layer includes only the first twist-aligned region T1, a region subjected to splay-bend alignment transformation only expands in the first direction. In this way, the region subjected to splay-bend alignment transformation can expand into the splay-aligned region S more swiftly and more reliably when the liquid crystal layer includes the second twist-aligned region T2 in addition to the first twist-aligned region T1.

In the liquid crystal display device 2 shown in FIG. 2A, the two adjacent first splay-aligned regions S1 are connected to each other via the second splay-aligned region S2. In other words, the first splay-aligned regions S are not isolated from each other with the second twist-aligned regions T2, but a space is formed between the two adjacent second twist-aligned regions T2 in the second direction. This ensures occurrence of the splay-bend alignment transformation in the splay-aligned region S. The reason will be described as follows with reference to FIGS. 4A, 4B and 5.

Figure 4A:
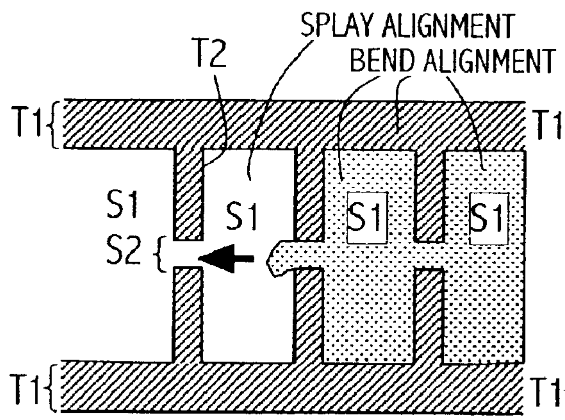
FIGS. 4A and 4B are diagrammatic views demonstrating splay-bend alignment according to the present invention.

The liquid crystal layer shown in FIG. 4A includes a plurality of first splay-aligned regions S1 and a plurality of second splay-aligned regions S2. The adjacent first splay-aligned regions S1 are continuous to each other via the corresponding second splay-aligned region S2. In other words, the second splay-aligned region S2 connects the adjacent first splay-aligned regions S1 to each other. On the contrary, a liquid crystal layer in FIG. 5 as a comparative example includes no second splay-aligned regions S2, but includes the first splay-aligned regions S1 independent of each other. In other words, the second twist-aligned regions T2 separate the first splay-aligned regions S1 from each other.

Figure 5:
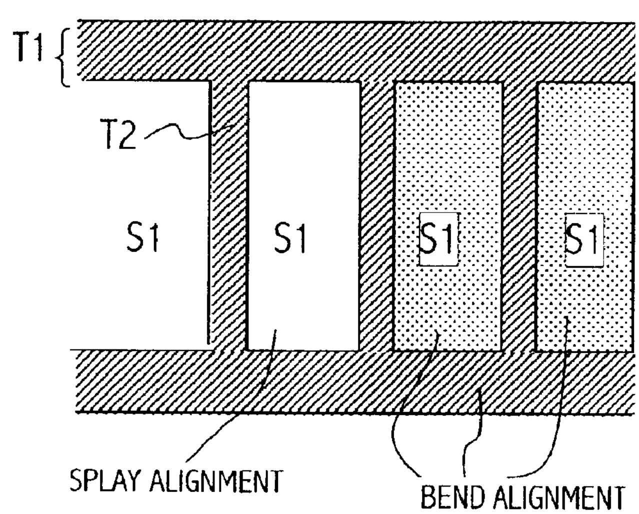
FIG. 5 is a diagrammatic view demonstrating splay-bend alignment of a comparative example.

Samples of liquid crystal layers having the structures diagrammatically shown in FIGS. 4A and 5 were produced, and a voltage was applied across the liquid crystal layer, to observe splay-bend alignment transformation.

Figure 4B:
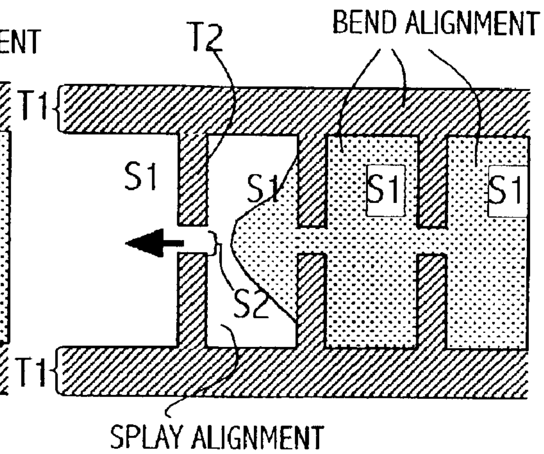

In the liquid crystal layer shown in FIG. 4A, the following was observed. As shown in FIG. 4B, even if some first splay-aligned region S1 failed in splay-bend alignment transformation for some reason, a region exhibiting bend alignment gradually expanded from another first splay-aligned region S1 already subjected to the splay-bend alignment transformation. After a lapse of a certain time, the entire liquid crystal layer was transformed to bend alignment.

On the contrary, in the liquid crystal layer shown in FIG. 5, if some first splay-aligned region S1 failed in splay-bend alignment transformation, the failed first splay-aligned region S1 was not finally transformed to bend alignment. As a result, in this liquid crystal layer, it was not possible to transform the entire display area to bend alignment.

As described above, it was found that the splay-bend alignment transformation occurred in the splay-aligned region S more reliably by connecting the two adjacent first splay-aligned regions S1 via the second splay-aligned region S2.

The pretilt direction of the liquid crystal molecules in the liquid crystal display device 2 (R1 and R2 in FIG. 1) is preferably parallel to the first direction when the first direction is the horizontal direction (as is viewed from the observer viewing the display plane). In a TFT type liquid crystal display device, the horizontal direction is typically the direction in which gate lines extend. By setting the pretilt in this way, the twisted alignment can be maintained more stably, and thus the splay-bend alignment transformation occurs more reliably. The pretilt direction of the liquid crystal molecules can be controlled with the rubbing of alignment films formed on the surfaces of the substrates facing the liquid crystal layer, for example.

Figure 6:
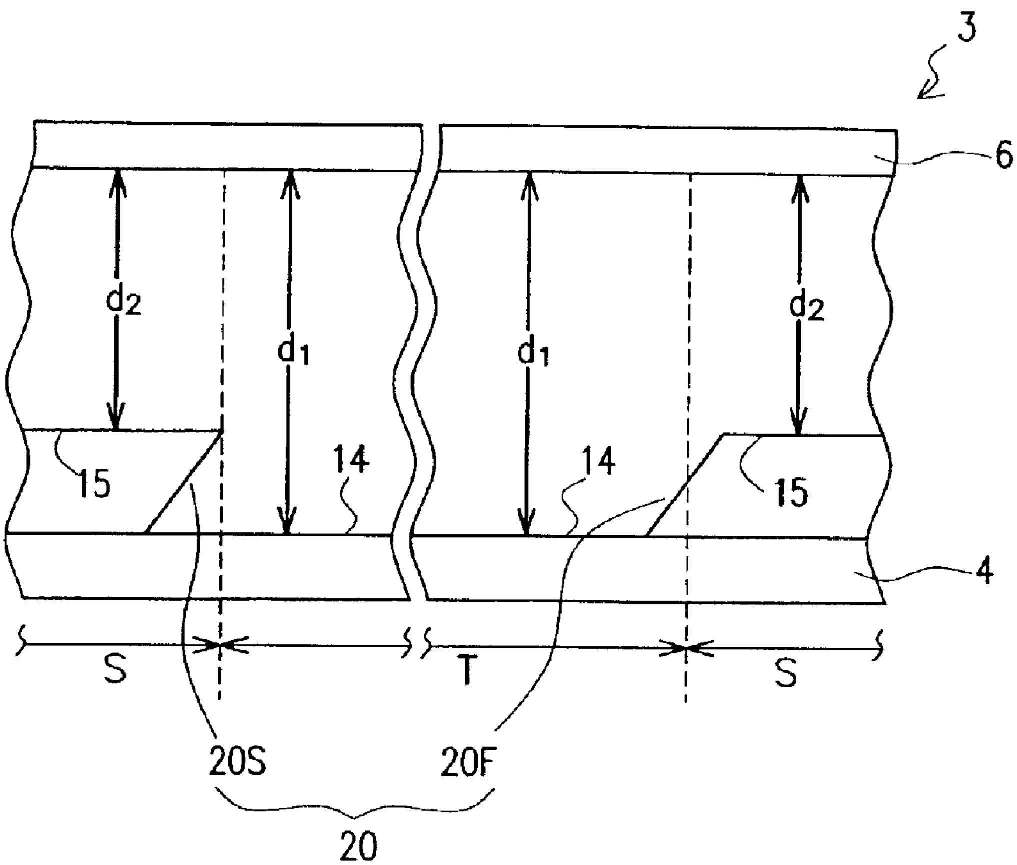
FIG. 6 is a partial cross-sectional view of a liquid crystal display device in another aspect of the present invention.

Next, a liquid crystal display device 3 in the second aspect of the present invention will be described with reference to FIGS. 6, 7 and 8. FIG. 6 is a partial cross-sectional view of the liquid crystal display device 3, and FIGS. 7 and 8 are cross-sectional views of step portions of the liquid crystal display device 3.

The liquid crystal display device 3 includes a plurality of steps 20 on the surface of at least one of first and second substrates 4 and 6 facing a liquid crystal layer. Each of the steps 20 includes an upper face 15, a lower face 14 and a side face 21F or 21S connecting the upper and lower faces. The step 20 is formed so that the thickness of the region of the liquid crystal layer located above the lower face 14 is d1 and the thickness of the region of the liquid crystal layer located above the upper face 15 is d2. That is, the splay-aligned region S is formed above the upper faces 15 of the steps 20, while the twist-aligned region T is formed above the lower faces 14 of the steps 20.

Figure 7:
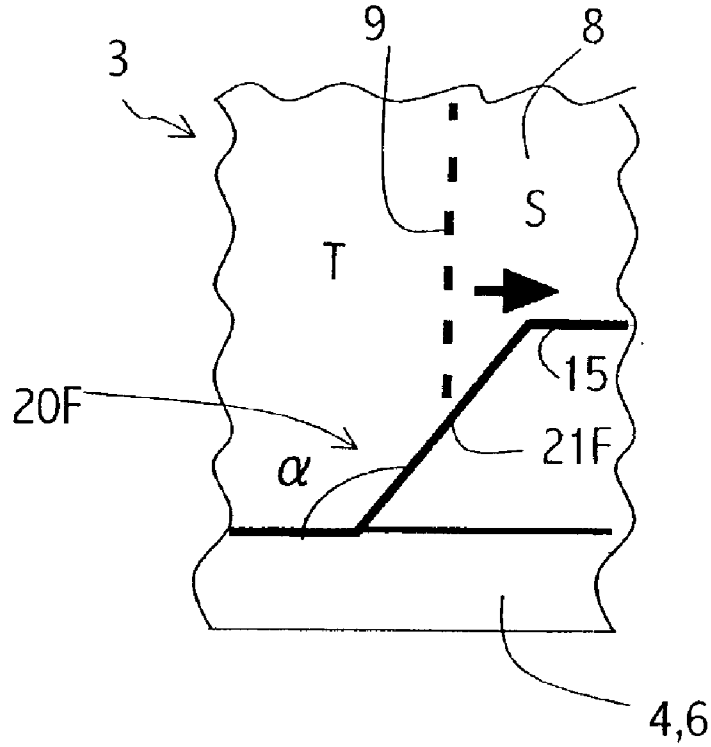
FIG. 7 is a cross-sectional view of a step portion of the liquid crystal display device of FIG. 6.
Figure 8:
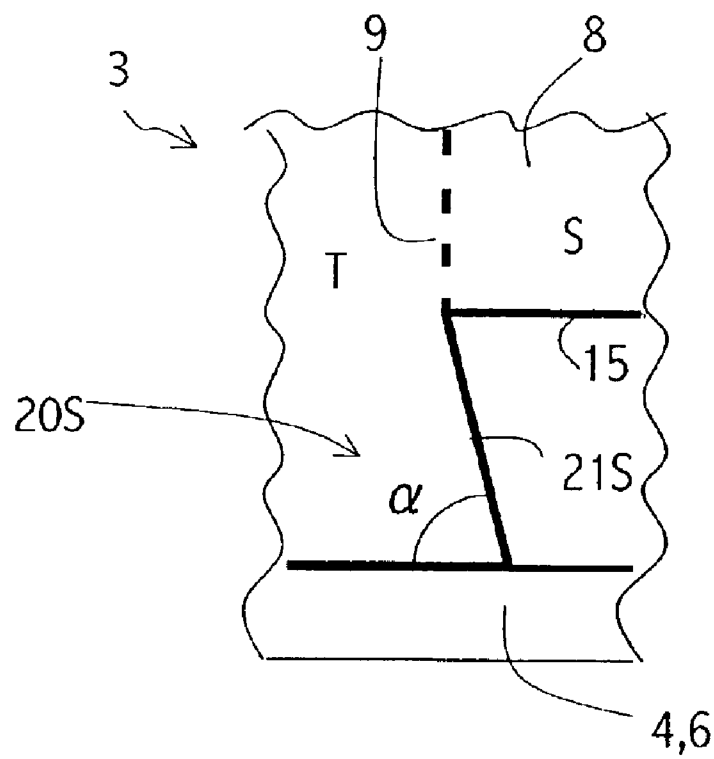
FIG. 8 is a cross-sectional view of another step portion of the liquid crystal display device of FIG. 6.

The steps 20 include first steps 20F shown in FIG. 7 and second steps 20S shown in FIG. 8, which are different in shape from each other. That is, the angle α of the first step shown in FIG. 7, defined by the lower face 14 and the side face 21F, is an obtuse angle exceeding 90°. The step of this shape is called a normal step. The angle α of the second step shown in FIG. 8, defined by the lower face 14 and the side face 21S, is an acute angle less than 90°. The step of this shape is called an inverted step.

As shown in FIG. 7 or 8, during non-voltage application, the regions above the lower face 14 and the upper face 15 of the step 20 are the twist-aligned region T and the splay-aligned region S, respectively. A boundary 9 exists between the splay-aligned region S and the twist-aligned region T. In the normal step 20F shown in FIG. 7, the boundary 9 is roughly at the middle of the height of the side face 21F, for example. In the inverted step 20S shown in FIG. 8, the boundary 9 is at the top edge of the side face 21S, for example. Note that the position of the boundary 9 varies with various conditions such as the temperature, the height of the step, and the thickness of the liquid crystal layer. With application of a voltage, the twist-aligned region T of the liquid crystal layer is transformed to bend alignment and turned to the bend-aligned region. With this transformation, the boundary 9 becomes a disclination line. Hereinafter, therefore, the boundary 9 is also called the disclination line 9.

In the case of the normal step 20F shown in FIG. 7, when a voltage is applied to the liquid crystal layer, the disclination line 9 shifts in the direction shown by the arrow in FIG. 7, climbing up along the side face 21F of the normal step 20F. That is, the twist-aligned region T is swiftly transformed to bend alignment, and the region exhibiting bend alignment expands into the splay-aligned region S.

On the contrary, in the case of the inverted step 20S shown in FIG. 8, when a voltage is applied to the liquid crystal layer, the disclination line 9 stays at the edge of the inverted step 20S, keeping the aligned state of the twist-aligned region T and the splay-aligned region S on both sides of the disclination line 9 unchanged. That is, the splay-aligned region S maintains the splay alignment irrespective of the transformation of the twist-aligned region T to bend alignment.

Figure 9A:
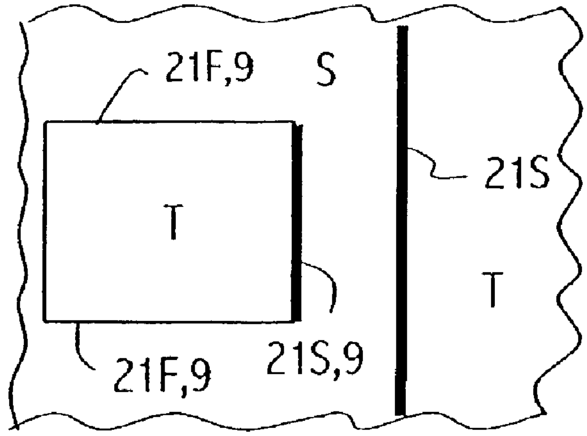
FIGS. 9A to 9C are partial cross-sectional views of a liquid crystal display device having normal steps and inverted steps, diagrammatically showing the aligned state of a liquid crystal layer.
Figure 9B:
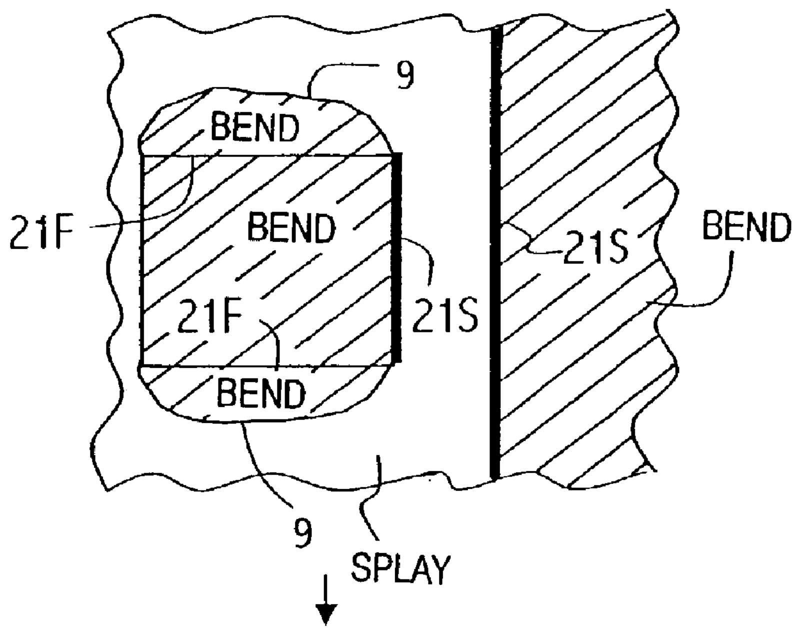
Figure 9C:
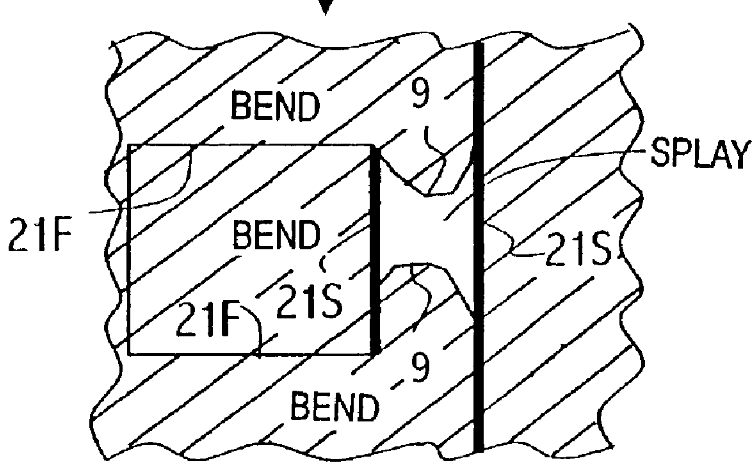

FIGS. 9A to 9C are partial plan views of a liquid crystal display device in which a step 20 having both normal side faces 21F and inverted side faces 21S is formed on one substrate, and diagrammatically shows the aligned state of a liquid crystal layer. As shown in FIG. 9A, when no voltage is applied to the liquid crystal layer, the region of the liquid crystal layer having a smaller thickness (region above the upper face of the step 20) is the splay-aligned region S, and the region of the liquid crystal layer having a larger thickness (region above the lower face of the step 20) is the twist-aligned region T. The twist-aligned region T and the splay-aligned region S face each other with a disclination line 9 therebetween, and the aligned states of these regions are kept in equilibrium. In FIG. 9A, for simplification, the side faces 21F and 21S of the step 20 are represented by a mere line although they actually have an area, and the disclination line 9 is assumed matching with this line.

When a voltage is applied to the liquid crystal display device described above, first, the twist-aligned region T is swiftly transformed from the twisted alignment to bend alignment, and the region exhibiting bend alignment expands into the splay-aligned region S, as shown in FIG. 9B. The disclination lines 9 shift comparatively easily near the normal side faces 21F, allowing swift expansion of the region exhibiting bend alignment. On the contrary, near the inverted side faces 21S, the disclination lines 9 shift less easily, keeping the bend-aligned region and the splay-aligned region unchanged on both sides of the disclination lines 9 as the boundaries. As the time passes from the voltage application, the bend-aligned region expands into the splay-aligned region except for an area near the inverted side faces 21S as shown in FIG. 9C.

As described above, by controlling the shape of the step, it is possible to control the easiness of the expansion of the bend-aligned region, transformed from the twist-aligned region T located above the lower face 14 as the nucleation site, into the splay-aligned region S located above the upper face 15 beyond the step 20. In other words, it is possible to control whether to swiftly cause splay-bend alignment transformation in the splay-aligned region S, or to maintain the splay-aligned region.

In the liquid crystal display devices 2 and 3 in the first and second aspects of the present invention described above, the 180-degree twist-aligned region T was used as the nucleation site for the splay-bend alignment transformation of the splay-aligned region S. The liquid crystal display device of the present invention is not limited to this. For example, as disclosed in Japanese Patent Gazette No. 3183633, a region of a high pretilt angle may be formed partly in the liquid crystal layer to use this region as the nucleation site for the splay-bend alignment transformation.

In the liquid crystal display devices 2 and 3 in the first and second aspects of the present invention described above, the thickness of the liquid crystal layer 8 was varied partly so that the regions of the liquid crystal layer 8 having a larger thickness serve as the twist-aligned region T. The liquid crystal display device of the present invention is not limited to this. Instead, the pitch p of the liquid crystal layer 8 may be varied with positions. For example, as disclosed in EP 1124153 A2, the pitch p can be made smaller in a predetermined region by mixing a chiral prepolymer in a liquid crystal layer and polymerizing the chiral prepolymer existing in the predetermined region by a selective irradiation process, to thereby form the twist-aligned region T.

Hereinafter, the present invention will be described in detail by way of example. The liquid crystal display device described in detail in the following example uses a nematic liquid crystal material having positive dielectric anisotropy as the liquid crystal layer. It should be noted that the present invention is not limited to this, but is also applicable to a surface-mode (SBD mode) nematic liquid crystal display device using a nematic liquid crystal material having negative dielectric anisotropy as the liquid crystal layer, as disclosed in U.S. Pat. No. 4,566,758. However, in consideration of the response speed, the practicability and the material technology, use of a liquid crystal material having positive dielectric anisotropy is preferred.

EXAMPLE

Figure 10:
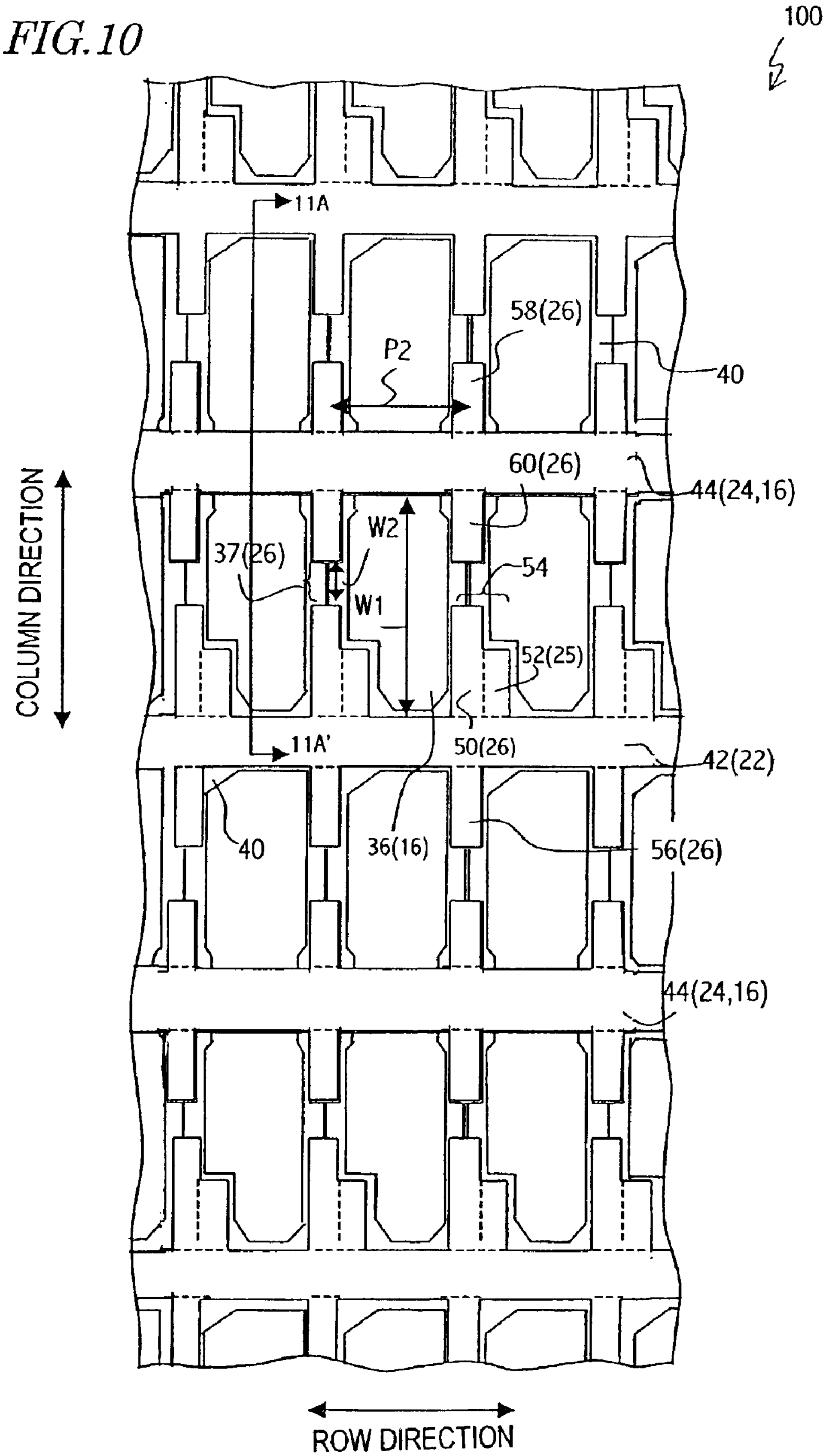
FIG. 10 is a plan view of a liquid crystal display device of an example of the present invention.
Figure 11:
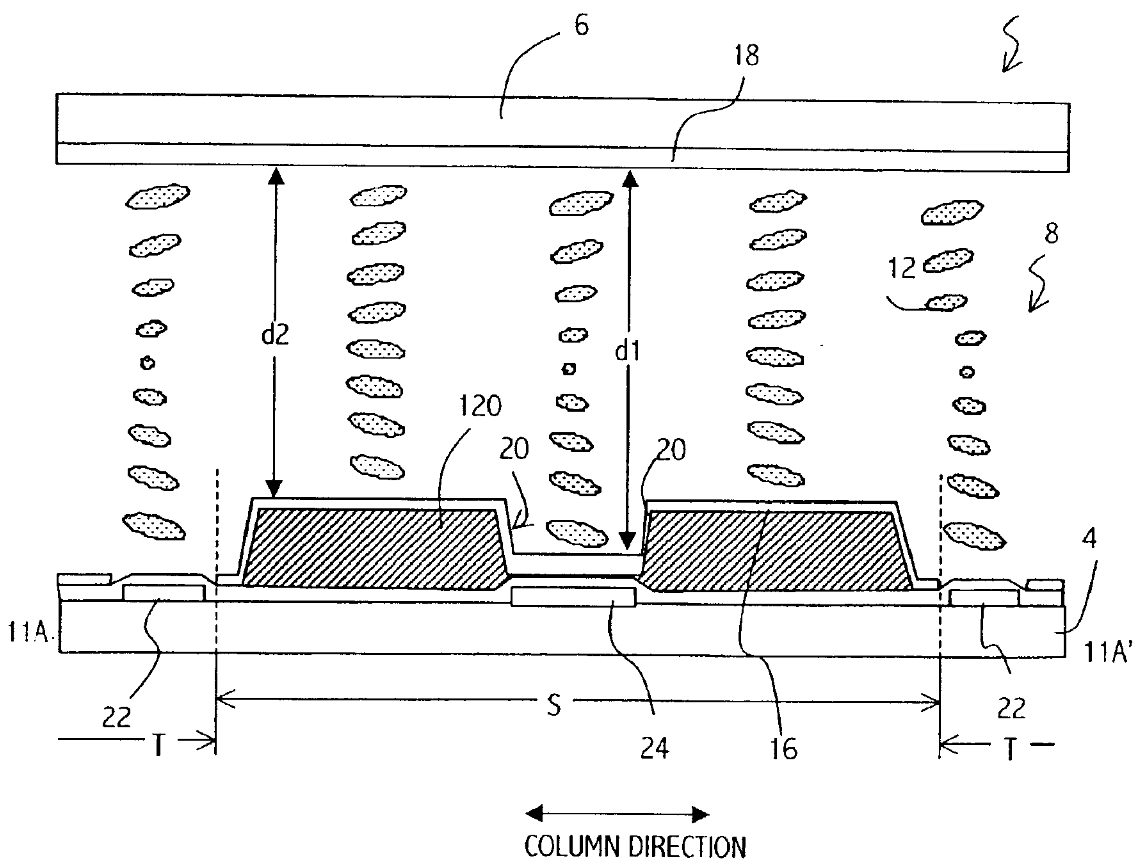
FIG. 11 is a cross-sectional view taken along line 11A–11A' of FIG. 10.
Figure 12:
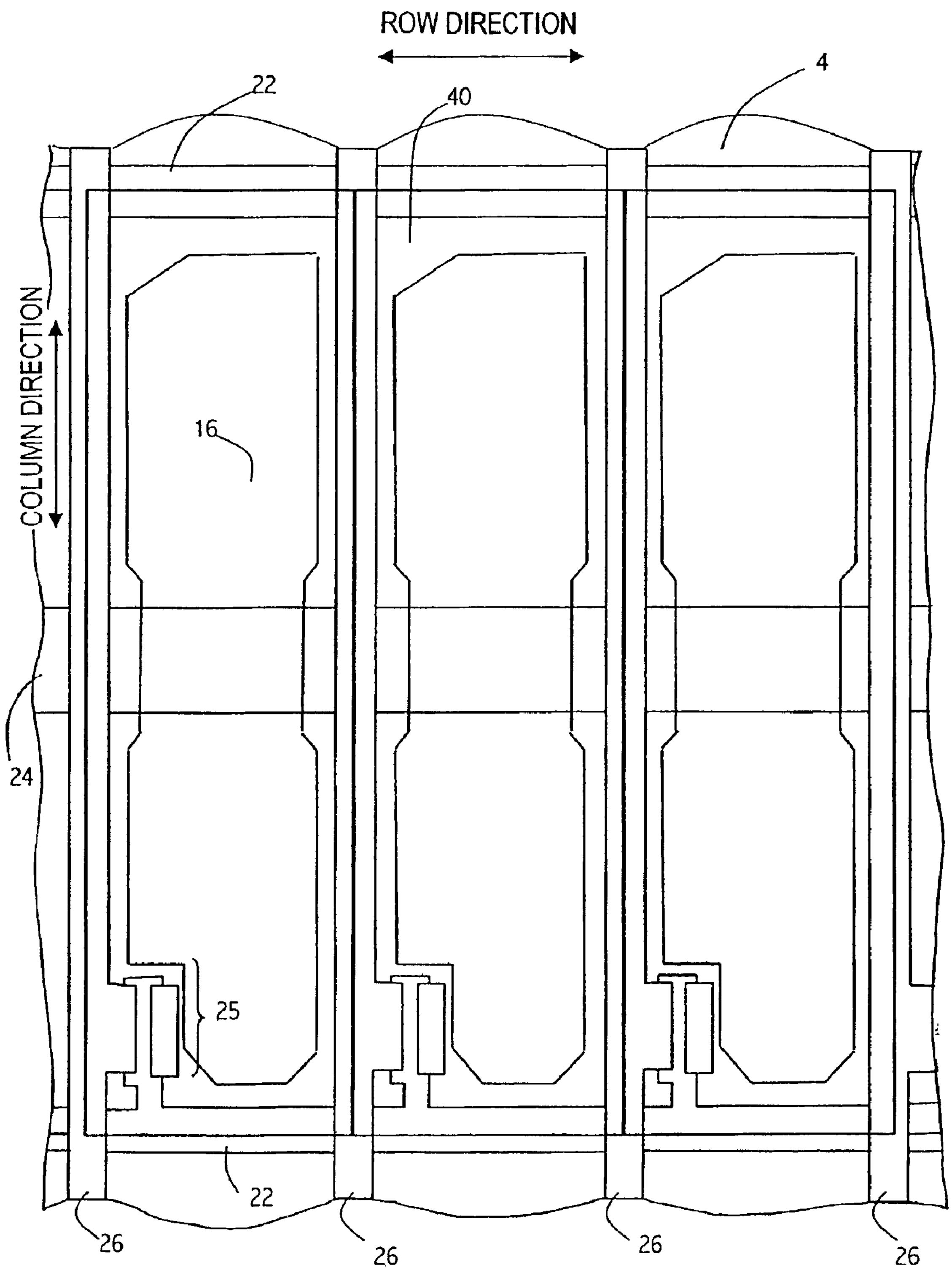
FIG. 12 is an enlarged plan view of three pixel regions of the liquid crystal display device of the example.

FIGS. 10, 11 and 12 are views illustrating a liquid crystal display device 100 of an example of the present invention. FIG. 10 is a plan view of the liquid crystal display device 100, FIG. 11 is a cross-sectional view of the liquid crystal display device 100 taken along line 11A–11A' of FIG. 10, and FIG. 12 is an enlarged plan view of three pixels of the liquid crystal display device 100. In FIG. 10, a second substrate 6 of the liquid crystal display device 100 is omitted, and in FIG. 12, the second substrate 6 and a liquid crystal layer 8 of the liquid crystal display device 100 are omitted, for simplification.

As shown in FIG. 11, the liquid crystal display device 100 includes a first substrate 4, the second substrate 6 and the liquid crystal layer 8 interposed between the substrates 4 and 6. The liquid crystal layer 8 is made of an Np liquid crystal material with a chiral dopant mixed therein.

As shown in FIGS. 10 and 12, on the surface of the first substrate 4 facing the liquid crystal layer, a plurality of gate lines 22 are formed to extend in the row direction and a plurality of source lines 26 are formed to extend in the column direction, forming a matrix shape as a whole. Switching elements (for example, thin film transistors (TFTs)) 25 are formed at the respective crossings of the gate lines 22 and the source lines 26. The switching elements 25 are connected to corresponding pixel electrodes 16 made of a transparent conductive material. A plurality of common lines 24 for formation of storage capacitances are also formed on the first substrate 4. The common lines 24 extend in parallel with the gate lines 22 in a position between the adjacent gate lines 22.

As shown in FIG. 11, a counter electrode 18 is formed over the entire surface of the second substrate 6 facing the liquid crystal layer. The liquid crystal layer 8 is driven with a voltage applied between the pixel electrodes 16 and the counter electrode 18. On the second substrate 6, a light-shading layer (black matrix) 40 is formed to cover the portions corresponding to the switching elements 25, the gate lines 22 and the source lines 26. The light-shading layer 40 is shown in FIGS. 10 and 12 for simplification of description although it is actually placed on the second substrate 6.

In the liquid crystal display device 100, a plurality of steps 20 are formed on the surface of the first substrate 4 facing the liquid crystal layer as shown in FIG. 11. The steps 20 are constructed of a resin layer 120 having a thickness in the order of 1 to 10 microns and grooves formed on the resin layer 120, for example. Due to the existence of the resin layer 120, liquid crystal regions having a thickness of d2 are formed right above the portions of the resin layer 120 (upper faces of the steps 20), which are to be the splay-aligned region S. Also, liquid crystal regions having a thickness of d1 (>d2) are formed above the bottoms of the grooves of the resin layer 120 (lower faces of the steps 20), which are to be the twist-aligned region T. The resin layer 120 may not be completely removed at the grooves, but recesses may be formed on the resin layer 120 and the bottoms of the recesses may be used as the lower faces of the steps 20.

When a voltage is applied across the liquid crystal layer 8, the twist-aligned region T is transformed to bend alignment from the twisted alignment. Subsequently, with the twist-aligned region T transformed to bend alignment serving as the nucleation site, the region exhibiting bend alignment swiftly expands into the splay-aligned region S. In this way, the splay-aligned region S is transformed to bend alignment. The twist-aligned region T as the nucleation site for the splay-aligned region S should preferably be placed to be outside the display area. The reason is that the optical response to voltage application is different between the bend alignment of the splay-aligned region S and the bend alignment of the twist-aligned region T. By placing the twist-aligned region in the light-shading portion, therefore, the uniformity of display improves.

Referring to FIG. 10, in the liquid crystal display device 100, the twist-aligned region T includes a plurality of first twist-aligned regions 42 and 44 extending in the row direction and a plurality of second twist-aligned regions 54, 56, 58 and 60 extending in the column direction. The first twist-aligned regions 42 are formed along above the gate lines 22, and the first twist-aligned regions 44 are formed along above the common lines 24. In FIG. 10, the reference numeral "42 (22)", for example, indicates that the gate line 22 underlies the first twist-aligned region 42.

The second twist-aligned regions extend continuously from each of the first twist-aligned regions 42 and 44 upward and downward in the column direction. More specifically, the second twist-aligned regions 54 and 56 extend upward and downward, respectively, continuously from each of the first twist-aligned regions 42. The second twist-aligned regions 54 and 56 are formed along above the source lines 26 for each pixel, with the spacing (pitch P2) equal to the pixel pitch in the row direction. Each of the second twist-aligned regions 54 extending upward continuously from the first twist-aligned region 42 includes a portion 50 located above the source line 26 and a portion 52 located above the switching element. With this expanded portion 52 of the twist-aligned region 54 above the switching element, which is covered by the light-shading layer, a wider twist-aligned region is secured without decreasing the display area. Also, the second twist-aligned regions 58 and 60 extend upward and downward, respectively, continuously from each of the first twist-aligned regions 44 located above the common lines 24, at the same pitch P2. With the formation of the first and second twist-aligned regions as described above, each half pixel is roughly surrounded with the twist-aligned region.

The splay-aligned region S occupies the entire liquid crystal region other than the first and second twist-aligned regions described above. As shown in FIG. 10, the splay-aligned region S includes first splay-aligned regions 36 having a first width W1 in the column direction and second splay-aligned regions 37 having a second width W2 (<W1) in the column direction. Any two first splay-aligned regions 36 adjacent in the column direction with the first twist-aligned region 44 therebetween constitute one pixel. Any two first splay-aligned regions 36 adjacent in the row direction are connected to each other via the second splay-aligned region 37.

The rubbing direction of alignment films (not shown) of the liquid crystal display device 100 is preferably in parallel with the direction in which the gate lines 22 extend (row direction) when this direction is the horizontal direction (as is viewed from the observer viewing the display plane). By this arrangement, since the pretilt of the liquid crystal molecules is in parallel with the row direction, the twisted alignment can be kept more stable and thus the splay-bend alignment transformation occurs more reliably.

As in the illustrated example, it is preferable to place the first splay-aligned regions 36 in the display area, and place the second splay-aligned regions 37 outside the display area together with the twist-aligned region T. By forming the second splay-aligned regions 37 across the twist-aligned region T, to connect the adjacent first splay-aligned regions 36 to each other, the first splay-aligned regions 36 can be transformed to bend alignment more reliably. If the width W2 of the second splay-aligned regions 37 is excessively large, the effect of providing the second twist-aligned regions will not be obtained. If the width W2 is excessively small, the effect of providing the second splay-aligned regions 37, that is, the effect of connecting the first splay-aligned regions 36 will not be obtained. In view of these, the width W2 of the second splay-aligned regions 37 and the width W1 of the first splay-aligned regions 36 preferably satisfy the relationship $0.2W1 \leqq W2 \leqq 0.8W1$.

The adjacent first splay-aligned regions 36 are connected to each other via the second splay-aligned region 37. Therefore, as discussed above with reference to FIGS. 4A, 4B and 5, even if some first splay-aligned region 36 fails in splay-bend alignment transformation for some reason, the transformed region gradually expands into the failed first splay-aligned region 36 from another first splay-aligned region 36 already transformed to bend alignment via the second splay-aligned region 37. In addition, in the liquid crystal display device 100 shown in FIG. 10, the second splay-aligned regions 37 are formed at positions lined in the row direction, indicating that the spacing between the adjacent second splay-aligned regions 37 in the row direction is small. Therefore, the bend-aligned region can efficiently expand into the first splay-aligned regions 36 via the second splay-aligned regions 37.

The second twist-aligned regions 54, 56, 58 and 60 are formed to be continuous with the first twist-aligned regions 42 and 44. Therefore, the first twist-aligned regions 42 and 44 and the second twist-aligned regions 54, 56, 58 and 60 can serve as more reliable nucleation sites, compared with the case that the first and second twist-aligned regions are separated from each other. The reason will be described as follows with reference to FIGS. 13A to 13D.

The resin layer 120 constituting the steps on the substrate 4 is formed of an inorganic or organic film having a thickness in the order of 1 to 10 microns. The energy difference between the 180-degree twisted alignment and the splay alignment is not so large. Therefore, if the thickness of the resin layer varies, or the cell gap varies, the 180-degree twist-aligned region T may not be obtained as originally designed depending on the position in the liquid crystal layer.

Figure 13A:
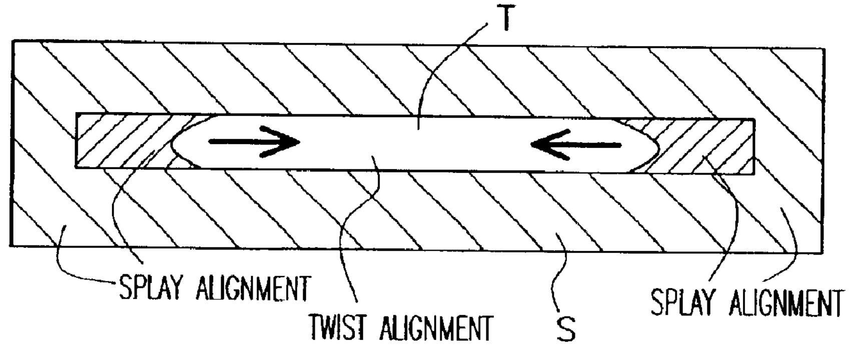
FIGS. 13A to 13D are diagrammatic views demonstrating the aligned state of a liquid crystal layer.

For example, suppose a stripe region having a thickness of d1 is formed in a liquid crystal layer having a thickness of d2 (d1>d2), to obtain the splay-aligned region S and the twist-aligned region T, respectively. If the aspect ratio of the twist-aligned region T is high, both ends of the twist-aligned region T may return (be transformed) from the twisted alignment to the splay alignment as shown in FIG. 13A even in an energy state in which the twisted alignment and the splay alignment can coexist. The twist-aligned region T shown in FIG. 13A is about 20 μm in width and about 1600 μm in length.

Figure 13B:
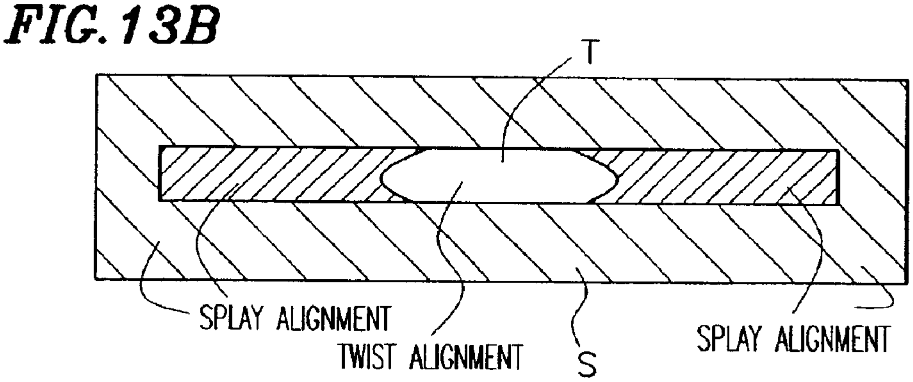

Once the region exhibiting the splay alignment is formed in the twist-aligned region T, the area of the region exhibiting the twisted alignment gradually decreases in the twist-aligned region T as shown in FIG. 13B, and finally, the entire twist-aligned region T exhibits the splay alignment. That is, formation of the twist-aligned region T as the nucleation site for transformation fails. The above condition that "the aspect ratio of the twist-aligned region T is high" is specifically that the aspect ratio of the twist-aligned region T exceeds 80:1. It has been confirmed from observation results that when the aspect ratio exceeds 80:1, coexistence of the twisted alignment and the splay alignment is difficult. It has also been confirmed from observation results that coexistance of the twisted alignment and the splay alignment is difficult when the width of the twist-aligned region T is about 10 μm or less, irrespective of the aspect ratio.

Figure 13C:
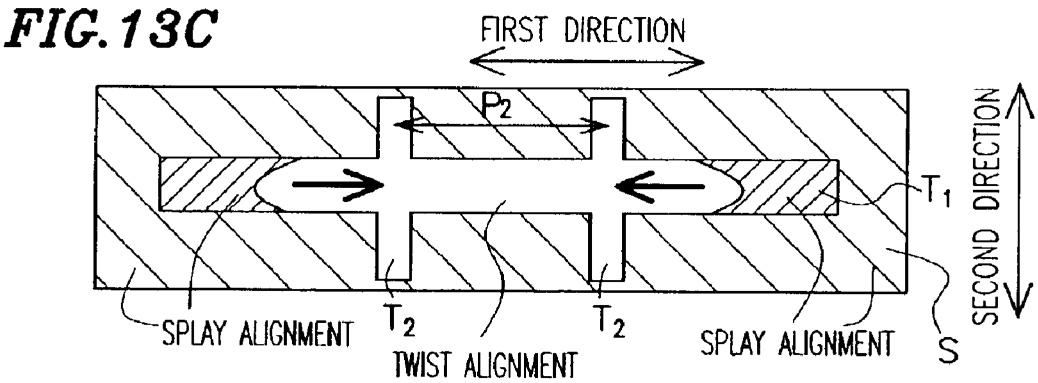
Figure 13D:
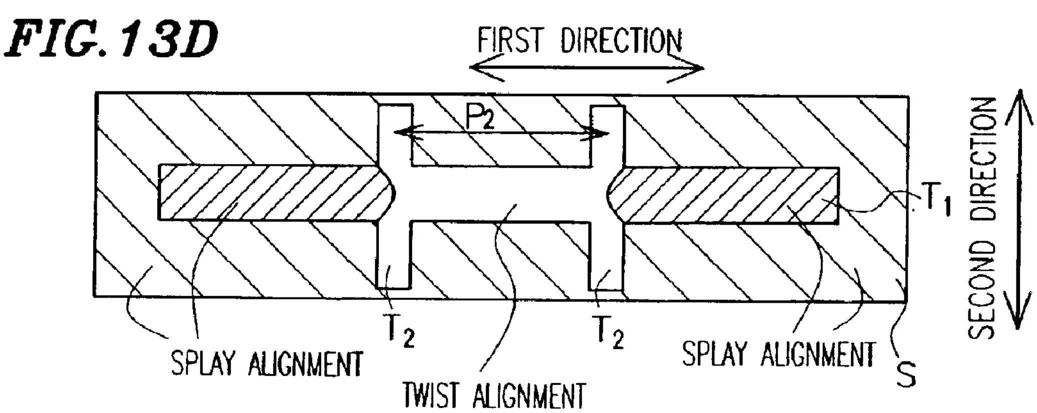

To solve the problem described above, the present inventors formed a twist-aligned region T as shown in FIG. 13C, which is essentially composed of a stripe-shaped first twist-aligned region T1 extending in a first direction and second twist-aligned regions T2 extending continuously from the first twist-aligned region T1 in a second direction crossing the first direction (preferably, at right angles). As a result, it was observed that the transformation from the twisted alignment to the splay alignment, starting at both ends of the first twist-alignment region T1 as shown in FIG. 13C, if any, stopped at the crossings of the first twist-aligned region T1 and the second twist-aligned regions T2 as shown in FIG. 13D.

Accordingly, in the liquid crystal display device 100, in which the second twist-aligned regions 54, 56, 58 and 60 extend continuously from the-first twist-aligned regions 42 and 44 and also cross the first twist-aligned regions 42 and 44 at right angles, these twist-aligned regions can serve as more reliable nucleation sites for transformation.

A preferred spacing between the adjacent second twist-aligned regions T2 was also examined. The spacing between the adjacent second twist-aligned regions T2 (P2 in FIG.

13C) was varied, to observe the coexisting state of the twisted alignment and the splay alignment in the first and second twist-aligned regions T1 and T2. The observation results are shown in Table 1 below.

TABLE 1

| Pitch P2 of T2 (μm) | 50 | 100 | 200 | 400 | 800 | 1000 | 1600 |
|---|---|---|---|---|---|---|---|
| Coexisting state | ○ | ○ | ○ | Δ | Δ | Δ | X |

As shown in Table 1, it was found that when the pitch P2 of the second twist-aligned regions T2 was 200 μm or less, the twisted alignment and the splay alignment coexisted stably. It was also found that when the pitch P2 of the second twist-aligned regions T2 was in the range of 400 to 1000 μm, it was less easy to keep the coexistence of the twisted alignment and the splay alignment, but the transformation to the splay alignment was suppressed to some extent due to the existence of the second twist-aligned regions T2. If the pitch P2 exceeded 1000 μm, no coexistence was possible between the twisted alignment and the splay alignment. The entire of the first twist-aligned region T1 and the second twist-aligned regions T2 were transformed to the splay alignment.

The pixel pitch of the liquid crystal display device 100 of this example is about 100 μm . Therefore, in consideration of the results shown in Table 1, it is found preferable to arrange the second twist-aligned regions T2 at a pitch twice or less as large as the pixel pitch. In the liquid crystal display device 100, the pitch P2 of the second twist-aligned regions is set at about 100 μm that is equal to the pixel pitch, and thus, it is possible to effectively stop the transformation of the first and second twist-aligned regions to the splay alignment. Thus, the first twist-aligned regions 42 and 44 and the second twist-aligned regions 54, 56, 58 and 60 can serve as more reliable nucleation sites for transformation.

The configuration of the liquid crystal display device 100 of this example is not limited to that described above with reference to FIGS. 10 and 11. For example, substantially the same effect can be obtained by liquid crystal display devices shown in FIGS. 14 to 19.

Figure 14:
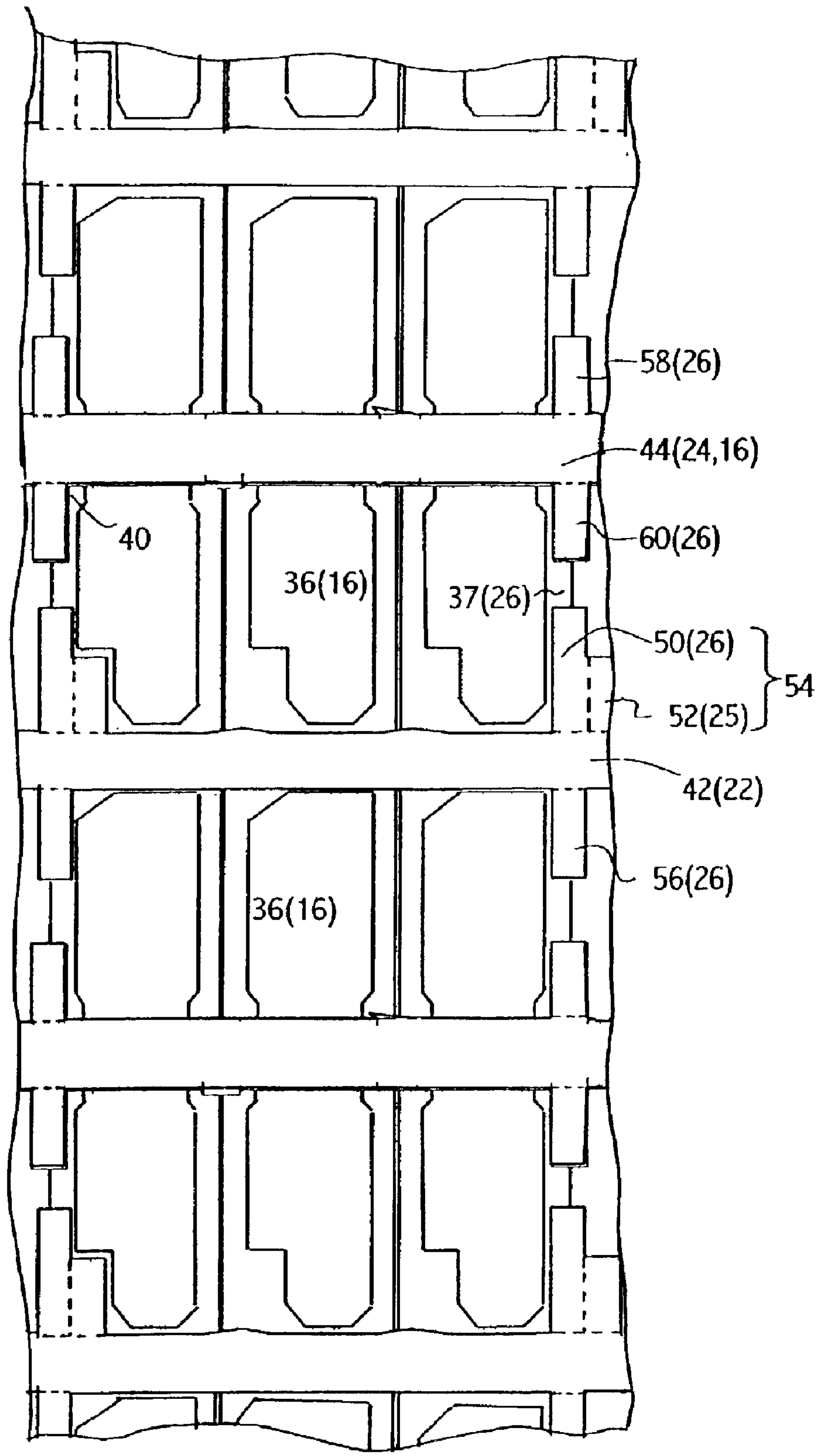
FIG. 14 is a plan view of a liquid crystal display device of an alteration to the example.

In the liquid crystal display device shown in FIG. 14, the second twist-aligned regions 54 and 56 extend continuously from the first twist-aligned regions 42 once every three pixels. The second twist-aligned regions 54 and 56 extend upward and downward, respectively, from the first twist-aligned region 42, along above the same source line 26. Likewise, the second twist-aligned regions 58 and 60 extend continuously from the first twist-aligned regions 44, which extend along above the common lines 24, once every three pixels. The splay-aligned region S includes first splay-aligned regions 36 and second splay-aligned regions 37. Each of the first splay-aligned regions 36 is substantially surrounded by the first and second twist-aligned regions 42, 44, 54, 56, 58 and 60, and is a region corresponding to three pixels in the row direction and a half pixel in the column direction. Each of the second splay-aligned regions 37 is formed between the second twist-aligned regions located above the same source line and facing each other in the column direction.

The configuration of the twist-aligned regions shown in FIG. 14 can be used for a color liquid crystal display device, for example. In a color liquid crystal display device, the width in the row direction of the light-shading layer can be larger in the portion located between adjacent sets of RGB pixels than in the portion located between adjacent pixels within the set. Therefore, by allocating R, G and B to the three pixels in each first splay-aligned region 36 and placing the second twist-aligned regions 54, 56, 58 and 60 between the adjacent R and B pixels, a larger width can be secured for the second twist-aligned regions.

Figure 15:
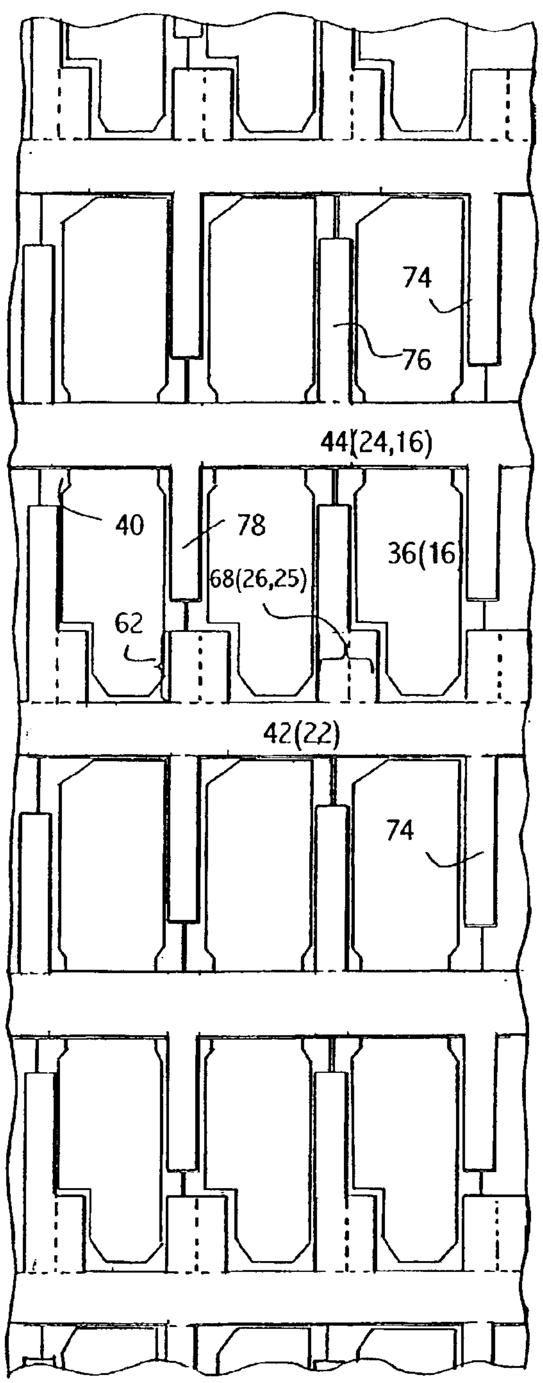
FIG. 15 is a plan view of a liquid crystal display device of another alteration to the example.

In the liquid crystal display device shown in FIG. 15, the spacing in the row direction between the adjacent second twist-aligned regions extending continuously from the first twist-aligned region 42 is different between the upward and downward regions. More specifically, second twist-aligned regions 62 and 68 extend upward continuously from the first twist-aligned regions 42 alternately every pixel, and include regions located above TFTs unusable for display. On the contrary, second twist-aligned regions 74 extend downward continuously from the first twist-aligned region 42 every two pixels. The second twist-aligned regions 62 and 68 adjacent in the row direction are different in the length in the direction of the source lines 26. Also, second twist-aligned regions 76 and 78 are alternately formed upward and downward, respectively, from the first twist-aligned regions 44 extending along above the common lines 24. The lengths of the second twist-aligned regions 76 and 78 are set so that the width W2 of the second splay-aligned regions 37 is roughly the same.

Figure 16:
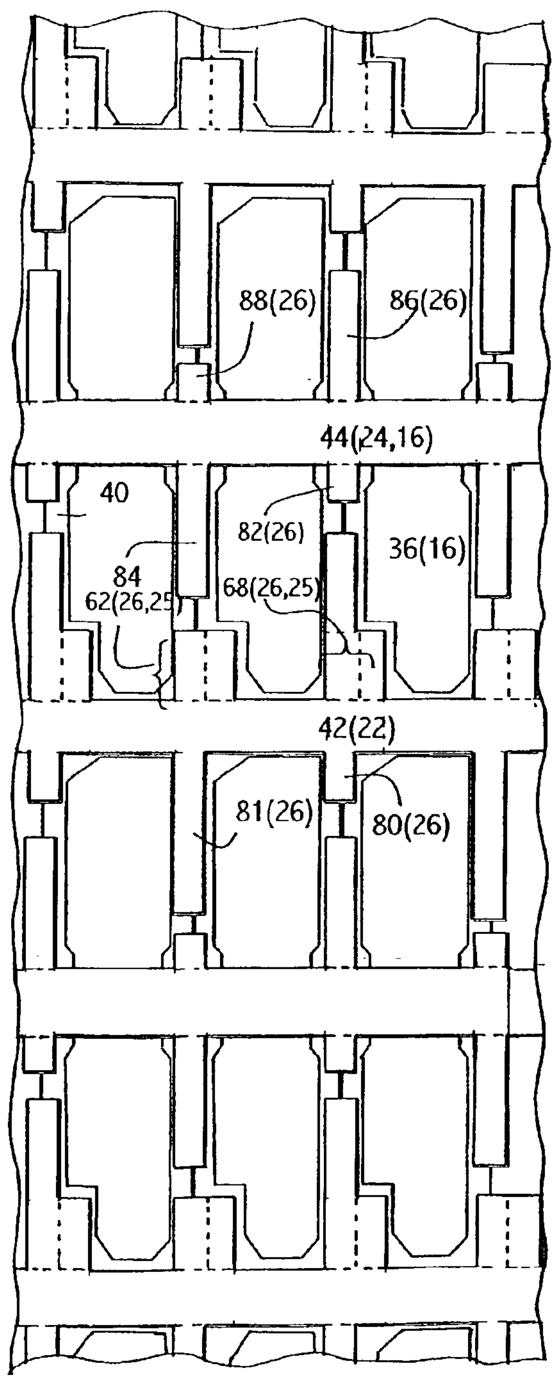
FIG. 16 is a plan view of a liquid crystal display device of yet another alteration to the example.

In the liquid crystal display device shown in FIG. 16, second twist-aligned regions 62 and 68, and 80 and 81 respectively extend continuously from the first twist-aligned regions 42 alternately every pixel, and second twist-aligned regions 82 and 84, and 86 and 88 respectively extend continuously from the first twist-aligned regions 44 alternately every pixel.

In the liquid crystal display devices shown in FIGS. 14 to 16, the second twist-aligned regions are located above the switching elements in addition to above the source lines, as in the liquid crystal display device shown in FIG. 10. Therefore, the second twist-aligned regions having a wider area can be formed in the region of the light-shading layer. In the liquid crystal display devices shown in FIGS. 14 to 16, the second twist-aligned regions extend continuously from the first twist-aligned regions. Alternatively, the first twist-aligned regions may be separate from the second twist-aligned regions as in liquid crystal display devices shown in FIGS. 17 to 19.

Figure 17:
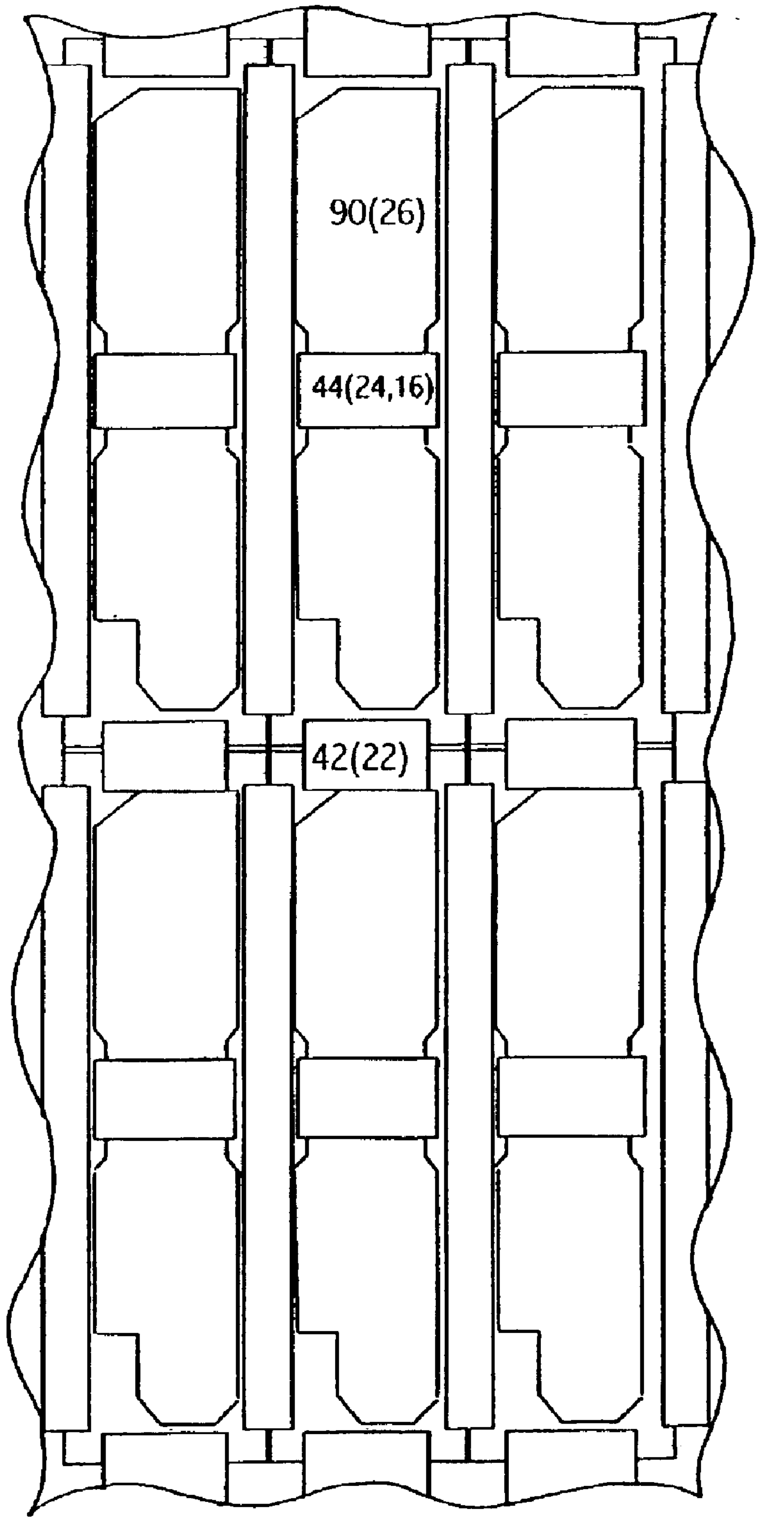
FIG. 17 is a plan view of a liquid crystal display device of yet another alteration to the example.

In the liquid crystal display device shown in FIG. 17, first twist-aligned regions 42 are formed independently for each pixel along above the gate lines 22. First twist-aligned regions 44 are also formed independently for each pixel along above the common lines 24. Each of second twist-aligned regions 90 extends along above the source lines 26 for a length equal to the pixel pitch in the column direction.

Figure 18:
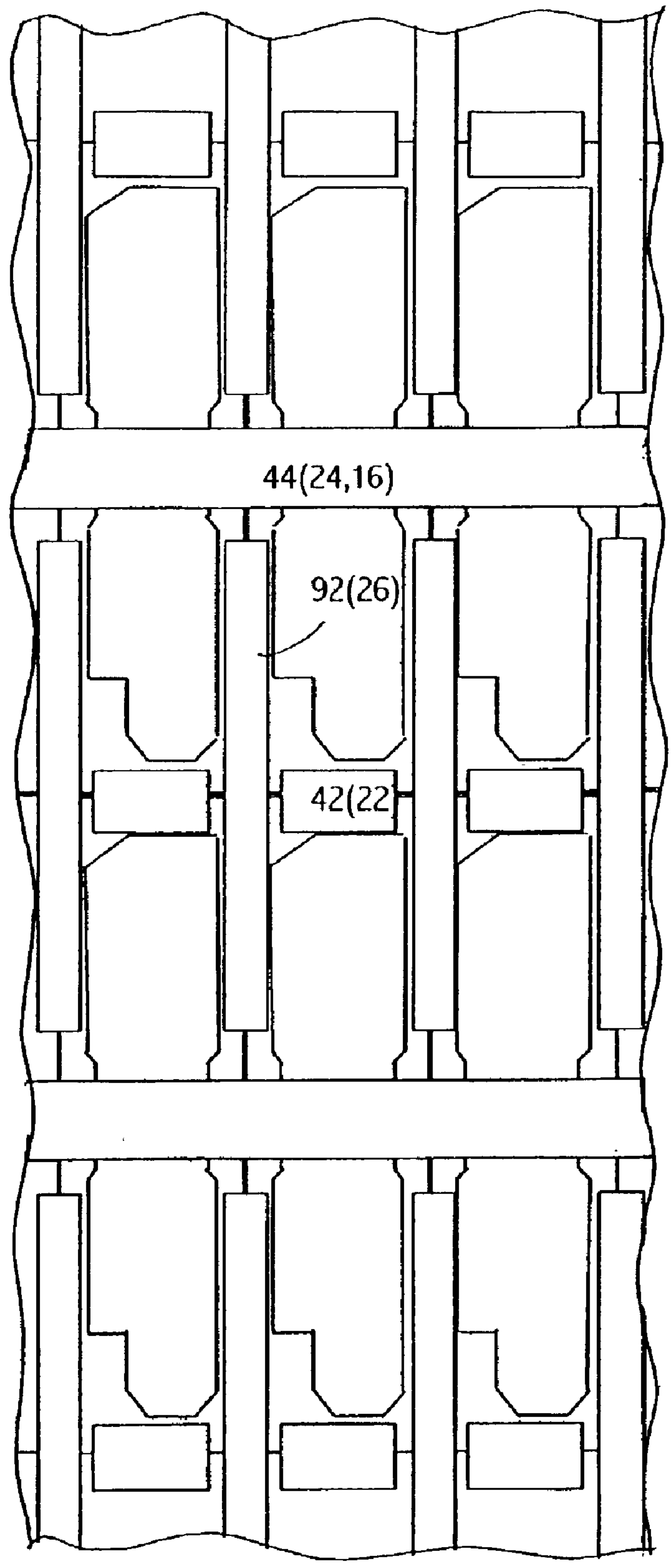
FIG. 18 is a plan view of a liquid crystal display device of yet another alteration to the example.

In the liquid crystal display device shown in FIG. 18, while first twist-aligned regions 42 are formed independently for each pixel along above the gate lines 22, first twist-aligned regions 44 extend continuously along above the common lines 24. Each of second twist-aligned regions 90 extends in the column direction between the two common lines adjacent in the column direction.

Figure 19:
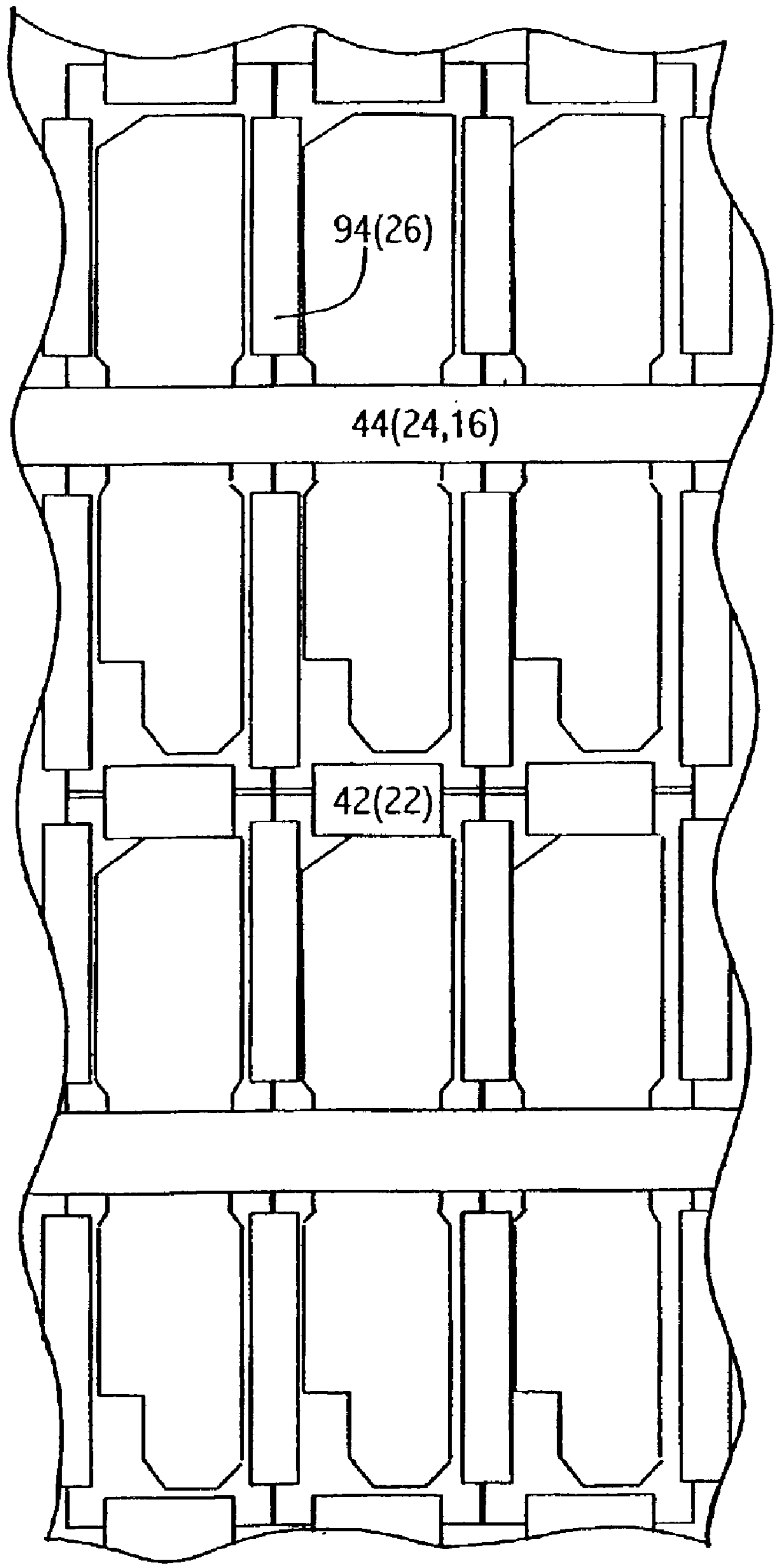
FIG. 19 is a plan view of a liquid crystal display device of yet another alteration to the example.

The liquid crystal display device shown in FIG. 19 is different from that in FIG. 18 in that second twist-aligned regions 94 are formed independently every half pixel pitch.

In the liquid crystal display devices shown in FIGS. 10 and 14 to 19, all of the first splay-aligned regions are connected to other first splay-aligned regions adjacent in the row or column direction via the second splay-aligned regions. Having this structure, it is possible to prevent the problem that part of the splay-aligned region S may fail to be transformed to bend alignment but be left in the splay alignment and thus be isolated from the other part of the splay-aligned region S in the liquid crystal region, as discussed with reference to FIGS. 4A, 4B and 5.

Figure 20:
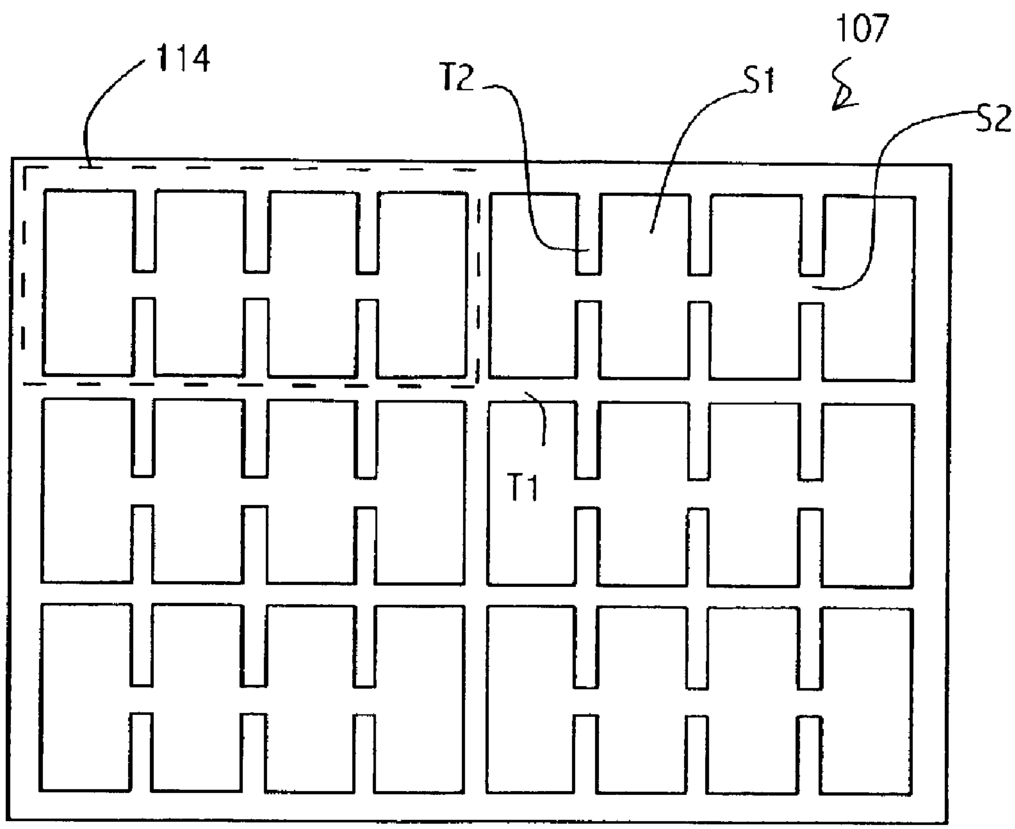
FIG. 20 is a plan view of a liquid crystal display device of yet another alteration to the example.

All of the first splay-aligned regions may not necessarily be connected to the adjacent first splay-aligned regions. For example, as shown in FIG. 20, a liquid crystal display device may have a plurality of clusters 114, in which first splay-aligned regions S1 in one cluster are not connected to first splay-aligned regions S1 in another cluster. This liquid crystal display device, denoted by 107, will be described in detail as follows.

As shown in FIG. 20, each of the plurality of clusters 114 of the liquid crystal display device 107 includes second splay-aligned regions S2, two or more first splay-aligned regions S1 connected to each other via the second splay-aligned regions S2, and first and second twist-aligned regions T1 and T2 surrounding the first and second splay-aligned regions S1 and S2. The first splay-aligned regions S1 in one cluster are not connected to, but isolated from the first splay-aligned regions S1 in another cluster.

As shown in FIG. 20, by connecting the plurality of first splay-aligned regions S1 to each other within one cluster 114, when any of the first splay-aligned regions S1 in the cluster 114 is transformed from the splay alignment to bend alignment, the region exhibiting the bend alignment expands into the splay-aligned regions within the cluster 114. Therefore, the liquid crystal display device 107 can also prevent the problem that some first splay-aligned region S1 may be kept in the splay alignment and isolated.

In FIG. 20, one cluster includes four first splay-aligned regions S1 lined in the row direction. The shape of the cluster and the number of the first splay-aligned regions S1 in one cluster are not limited to the above.

Next, the steps 20 in the liquid crystal display device 100 of this example will be described. The shape of the steps 20 formed on the substrate may be changed with the position at which the steps 20 are formed. This will be described with reference to FIGS. 7, 8, 10 and 12.

In general, during driving of the liquid crystal display device, the voltage applied to the gate lines 22 is higher than that applied to the source lines 26. For example, a voltage in the range of −12 V to +12 V or −20 V to +20 V is applied to the gate lines 22 while a voltage of about 5 V is applied to the source lines 26. This indicates that the electric field applied to the first twist-aligned regions 42 formed above the gate lines 22 is higher than that applied to the second twist-aligned regions 54, 56, 58 and 60 formed above the source lines 26. The first twist-aligned regions 42 are therefore more easily transformed from the twist alignment to bend alignment, and thus can be used effectively as the nucleation sites for transformation. A voltage equal to that applied to the source lines 26 is applied to the common lines 24 extending in parallel with the gate lines 26. Therefore, the first twist-aligned regions 44 are also easily transformed from the twist alignment to bend alignment. In consideration of the above, the second twist-aligned regions T2 are preferably formed above the source lines 26. Hereinafter, described are shapes of the steps effective for attaining the purposes described above, that is, for effectively using the first twist-aligned regions as the nucleation sites for transformation and using the second twist-aligned regions to improve the stability of the twisted alignment of the first twist-aligned regions (suppress transformation to the splay alignment).

As discussed above with reference to FIGS. 7 and 8, in the normal step as shown in FIG. 7, the disclination line 9 swiftly shifts upward along the side face 21F, whereby the region exhibiting the bend alignment expands into the splay-aligned region S. On the contrary, in the inverted step as shown in FIG. 8, the disclination line 9 stays keeping the aligned states of the twist-aligned region T and the splay-aligned region S on both sides of the disclination line 9.

In view of the above, the first twist-aligned regions 42 and 44 should be formed so that the side faces of normal steps extend along the gate lines 22 and the common lines 24. With this shape, the first twist-aligned regions can serve as more effective nucleation sites for transformation and thus the bend-aligned region can be swiftly expanded into the splay-aligned regions. In addition, the second twist-aligned regions 54, 56, 58 and 60 should be formed so that the side faces of inverted steps extend along the source lines 26. With this shape, the first twist-aligned regions can be suppressed from being transformed from the twisted alignment to the splay alignment during non-voltage application for the reason described before with reference to FIGS. 13A to 13D.

As described above, by using normal steps or inverted steps as the steps 20 appropriately depending on the positions at which the steps are formed, the bend-aligned regions can be expanded swiftly and the twist-aligned regions as the nucleation sites for bend alignment can be stabilized. Thus, the liquid crystal display device 100 can attain stability of the aligned state, improvement in display quality and the like.

Next, preferred methods for forming normal steps and inverted steps will be described. For formation of steps, in general, film formation processes using a resist or a photosensitive resin equivalent to the resist, metal, an insulator and the like are employed. Normal steps are typically formed by (1) a method using heat treatment, (2) a method using etching, and (3) a method using a photolithographic process. Reverse steps are however generally difficult in formation.

Figure 21A:
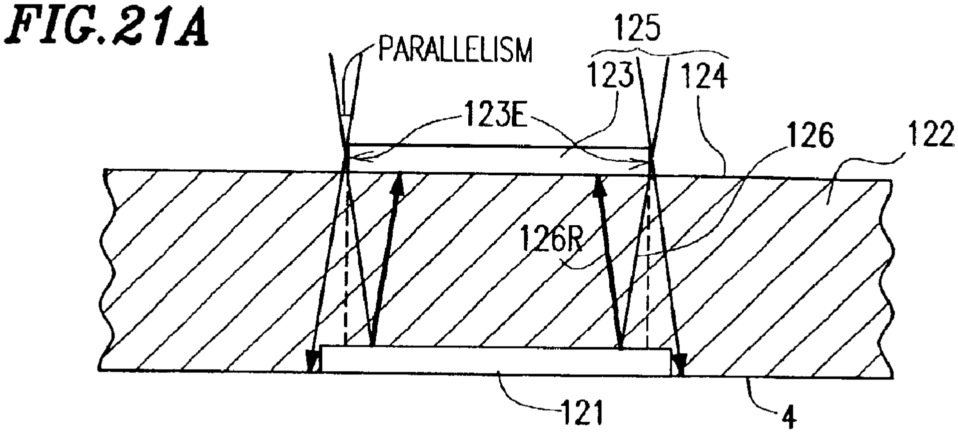
Figure 21B:
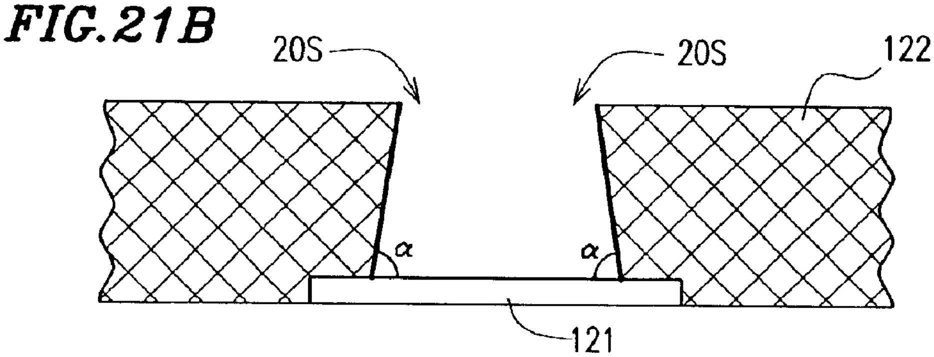
Figure 21C:
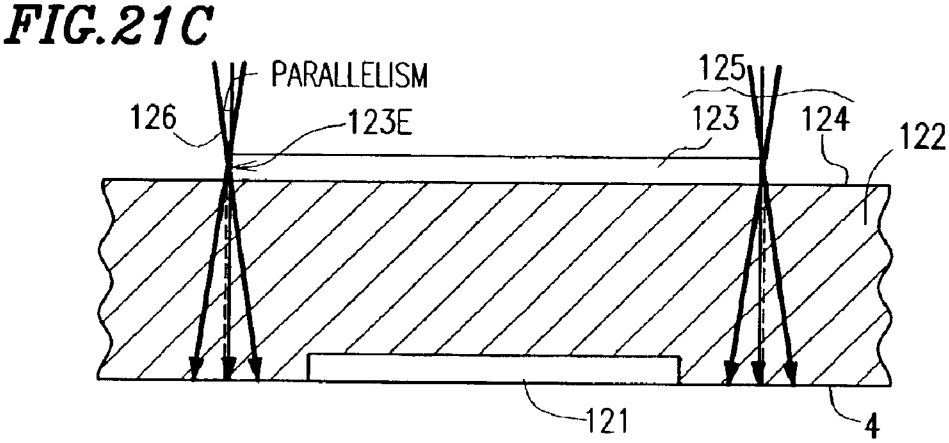
Figure 21D:
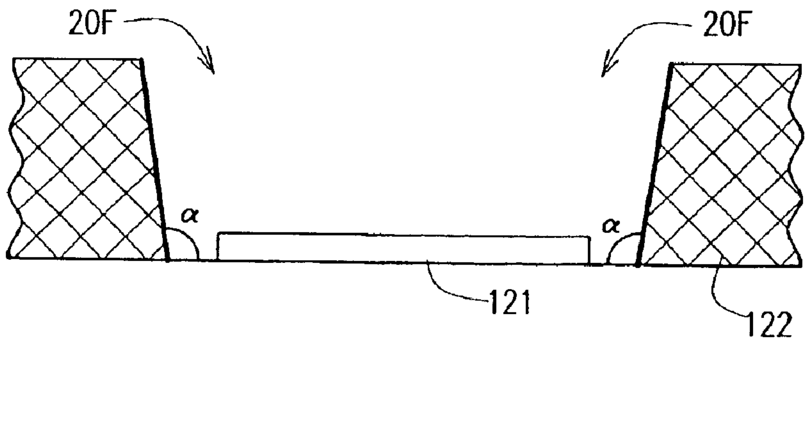
Figure 22A:
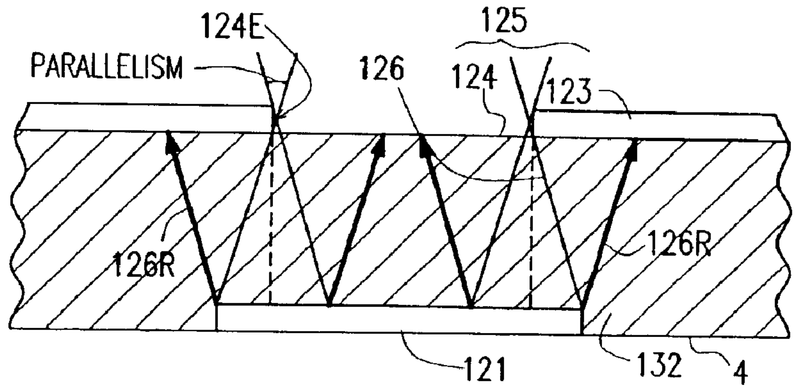
Figure 22B:
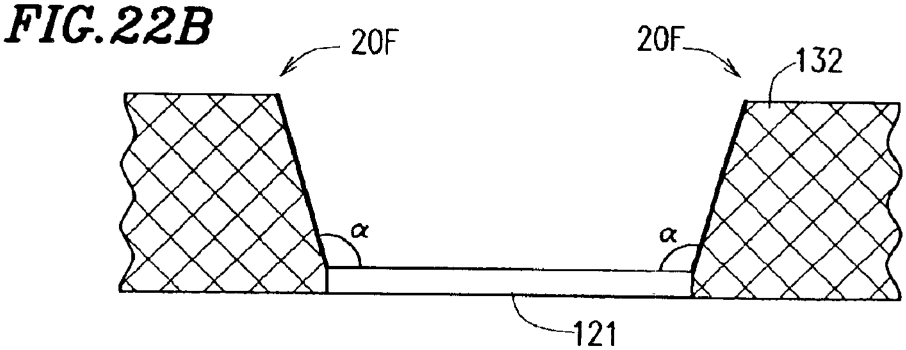
Figure 22C:
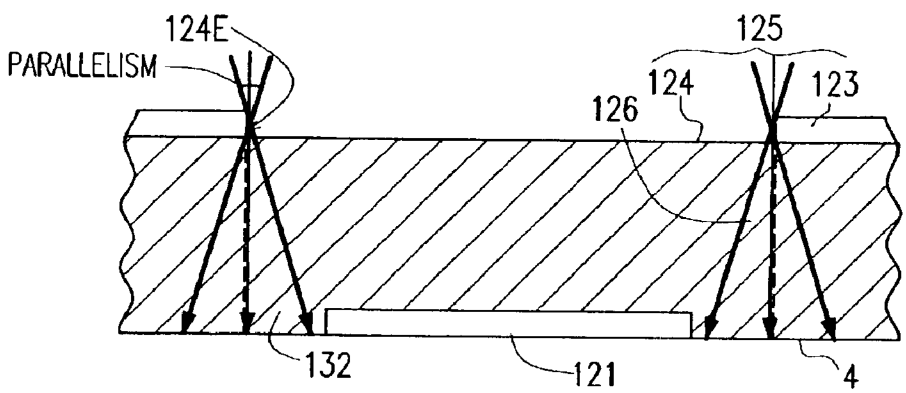
Figure 22D:
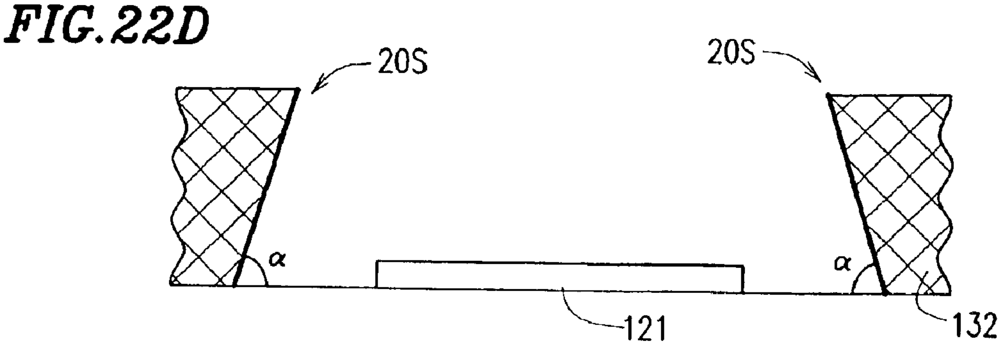

Referring to FIGS. 21A to 21D and 22A to 22D, methods using a photolithographic process will be described, in which normal steps and inverted steps can be easily formed simultaneously. FIGS. 21A to 21D demonstrate formation methods using a negative type photosensitive resin layer, in which FIGS. 21A and 21B illustrate process steps of formation of inverted steps and FIGS. 21C and 21D illustrate process steps of formation of normal steps. FIGS. 22A to 22D demonstrate formation methods using a positive type photosensitive resin layer 132, in which FIGS. 22A and 22B illustrate process steps of formation of normal steps and FIGS. 22C and 22D illustrate process steps of formation of inverted steps. Note that normal steps and inverted steps can be formed simultaneously although, in the following discussion, the formation of normal steps and the formation of inverted steps are described separately for simplification.

First, a method for forming inverted steps from a negative type photosensitive resin layer will be described with reference to FIGS. 21A and 21B. As shown in FIG. 21A, the substrate 4 having a high-reflectance region 121 on the principal plane is prepared. The high-reflectance region 121, which is higher in reflectance than the surrounding regions, is preferably the gate line 22, the source line 26 or the common line 24, made of a metal material. As described above, the side faces of inverted steps should preferably extend along the source line 26. Therefore, the high-reflectance region 121 is preferably the source line 26.

A negative type photosensitive resin layer 122 is then formed on the principal plane of the substrate 4. The photosensitive resin layer 122 is covered with a mask 125 having a light-shading portion 123 and a light-transmitting portion 124 in a predetermined pattern, and then irradiated with light 126 via the mask 125. The mask 125 is positioned so that the light-shading portion 123 is located above the high-reflectance region 121 with edges 123E of the light-shading portion 123 being inside the range of the high-reflectance region 121. The light 126 passing through the mask 125 into the photosensitive resin layer 122 reflects from the high-reflectance region 121 as reflected light 126R. Using the reflected light 126R, inverted steps 20S ($\alpha<90°$) are formed as shown in FIG. 21B.

Light output from a normal optical aligner has a parallelism of about 3° or less. However, the light 126 used for exposure of the photosensitive resin layer 122 should preferably have a parallelism in the range of about 5 to 10°. With this low parallelism, the light incident at the edges of the light-shading portion 123 is reflected from the high-reflectance region 121, and the reflected light (primary reflected light) can contribute to light exposure of the portion of the photosensitive resin layer 122 located under the mask.

Next, a method for forming normal steps from a negative type photosensitive resin layer will be described with reference to FIGS. 21C and 21D.

Unlike the formation of the inverted steps 20S described above, since no reflected light is required during light exposure for the formation of normal steps 20F, it is not necessary to form the high-reflectance region 121 on the substrate 4. However, the side faces of the normal steps preferably extend along the gate line 22 or the common line 24 as described above. In the following description, therefore, the case having the high-reflectance region 121 such as the gate line 22 and the common line 24 on the principal plane of the substrate 4 will be described.

The substrate 4 as described above is first prepared. The negative type photosensitive resin layer 122 is then formed on the principal plane of the substrate 4. The photosensitive resin layer 122 is covered with a mask 125 having a light-shading portion 123 and a light-transmitting portion (opening) 124 in a predetermined pattern, and then irradiated with light 126 via the mask 125. The mask 125 is positioned so that the light-shading portion 123 is located above the high-reflectance region 121 with edges 123E of the light-shading portion 123 being outside the area of the high-reflectance region 121. The light 126 passing through the mask 125 into the photosensitive resin layer 122 is not reflected from the high-reflectance region 121, and thus using only the irradiated light 126, the normal steps 20F ($\alpha>90°$) are formed as shown in FIG. 21D.

In the formation of the normal steps 20F, also, light having a parallelism in the range of about 5 to 10° is preferably used for exposure of the photosensitive resin layer 122, as in the formation of the inverted steps 20S described above. With this low parallelism, the light incident at the edges of the light-shading portion 123 can contribute to light exposure of the portion of the photosensitive resin layer 122 located under the mask, as shown in FIG. 22C.

Next, methods for forming normal steps and inverted steps from a positive type photosensitive resin layer 132 will be described. Contrary to the case of using the negative type photosensitive resin layer 122, in the case of using the positive type photosensitive resin layer 132, the normal steps 20F are formed by use of the reflected light 126R from the high-reflectance region 121. First, a method for forming the normal steps 20F from the positive type photosensitive resin layer 132 will be described.

As shown in FIG. 22A, the substrate 4 having a high-reflectance region 121 on the principal plane is prepared. The high-reflectance region 121 is higher in reflectance than the surrounding regions. As described above in relation to the method for forming normal steps by use of a negative type photosensitive resin layer, the high-reflectance region 121 is preferably the gate line 22 or the common line 24. The positive type photosensitive resin layer 132 is then formed on the principal plane of the substrate 4. The photosensitive resin layer 132 is covered with a mask 125 having a light-shading portion 123 and a light-transmitting portion 124 in a predetermined pattern, and then irradiated with light 126 via the mask 125. The mask 125 is positioned so that the light-transmitting portion 124 is located above the high-reflectance region 121 with edges 124E of the light-transmitting portion 124 being inside the high-reflectance region 121. The light 126 passing through the mask 125 into the photosensitive resin layer 122 is reflected from the high-reflectance region 121 as reflected light 126R. Using the reflected light 126R, the normal steps 20F ($\alpha>90°$) are formed as shown in FIG. 22B.

Next, a method for forming the inverted steps 20S from the positive type photosensitive resin layer 132 will be described. In this case, since no reflected light is required during light exposure for the formation of the inverted steps 20S, it is not necessary to form the high-reflectance region 121 on the substrate 4. However, the side faces of the inverted steps preferably extend along the source line 26 as described above. In the following description, therefore, the case of forming the high-reflectance region 121 such as the source line 26 on the principal plane of the substrate 4 will be described.

The substrate 4 as described above is first prepared. The positive type photosensitive resin layer 132 is then formed on the principal plane of the substrate 4. The photosensitive resin layer 132 is covered with a mask 125 having a light-shading portion 123 and a light-transmitting portion 124 in a predetermined pattern, and then irradiated with light 126 via the mask 125. The mask 125 is positioned so that the light-transmitting portion 124 is located above the high-reflectance region 121 with edges 124E of the light-transmitting portion 124 being outside the high-reflectance region 121. The light 126 passing through the mask 125 into the photosensitive resin layer 132 is not reflected from the high-reflectance region 121, and thus using only the irradiated light 126, the inverted steps 20S ($\alpha<90°$) are formed as shown in FIG. 22D.

In the case of using the positive type photosensitive resin layer 132 as shown in FIGS. 22A to 22D, as in the case of using the negative type photosensitive resin layer 122, the light 126 for exposure of the photosensitive resin layer 132 preferably has a parallelism in the range of about 5 to 10°.

According to the step formation methods described above, inverted steps, formation of which is generally considered difficult, can be easily formed simultaneously with formation of normal steps.

In the above description, the twist-aligned region T serving as the nucleation site for transformation was formed in the light-shading region so as not to be included in the display area. The present invention is not limited to this, but both the twist-aligned region T and the splay-aligned region S may be included in the display area. For example, in a transmission/reflection combination type liquid crystal display device, the twist-aligned region T of the liquid crystal layer having a larger thickness (d1) may be used as the transmission region and the splay-aligned region S thereof having a smaller thickness (d2<d1) may be used as the reflection region. In such a liquid crystal display device, both the twist-aligned region T and the splay-aligned region S can be used for display.

As described above, according to the present invention, it is possible to provide a liquid crystal display device enabling swift and reliable transformation from splay alignment to bend alignment or from bend alignment to splay alignment. The present invention is suitably applied to liquid crystal display devices used for monitors for computers and flat T.V. sets.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention that fall within the true spirit and scope of the invention.

What is claimed is:

1. A liquid crystal display device comprising:

a first substrate, a second substrate placed to face the first substrate, and a liquid crystal layer interposed between the first and second substrates, wherein the liquid crystal layer includes: a splay-aligned region in which a transformation from splay alignment to bend alignment or from bend alignment to splay alignment occurs according to a voltage applied; and a nucleation region adjacent to the splay-aligned region and serving as a nucleation site for initiating the transformation to occur in the splay-aligned region, the nucleation region includes a plurality of first nucleation regions, each of the plurality of first nucleation regions extending in a first direction, and a plurality of second nucleation regions, each of the plurality of second nucleation regions extending in a second direction different from the first direction, the splay-aligned region includes a plurality of first splay-aligned regions having a first width in the second direction and a plurality of second splay-aligned regions having a second width smaller than the first width in the second direction, and the plurality of first splay-aligned regions include two first splay-aligned regions connected to each other via one of the plurality of second splay-aligned regions, and wherein the first width of the plurality of first splay-aligned regions and the second width of the plurality of second splay-aligned regions are defined by the nucleation region.

2. The liquid crystal display device of claim 1, wherein the liquid crystal layer contains a chiral dopant, the nucleation region is a twist-aligned region exhibiting 180-degree twisted alignment during non-voltage application, the plurality of first nucleation regions are a plurality of first twist-aligned regions exhibiting 180-degree twisted alignment during non-voltage application, and the plurality of second nucleation regions are a plurality of second twist-aligned regions exhibiting 180-degree twisted alignment during non-voltage application.

3. The liquid crystal display device of claim 2, wherein d1/p of the twist-aligned region is greater than d2/p of the splay-aligned region where p is a pitch of the liquid crystal material, d1 is a thickness of the twist-aligned region of the liquid crystal layer, and d2 is a thickness of the splay-aligned region of the liquid crystal layer.

4. The liquid crystal display device of claim 3, wherein d1 is greater than d2.

5. The liquid crystal display device of claim 4, wherein at least one of the first substrate and the second substrate has a plurality of steps each having an upper face, a lower face, and a side face connecting the upper face and the lower face, and the splay-aligned region is formed above the upper faces of the plurality of steps, and the twist-aligned region is formed above the lower faces of the plurality of steps.

6. The liquid crystal display device of claim 5, wherein the plurality of steps include a first step and a second step, the side face of the first step has an angle exceeding 90° with respect to the lower face, and the side face of the second step has an angle less than 90° with respect to the lower face.

7. The liquid crystal display device of claim 6, wherein the side face of the first step extends in the first direction.

8. The liquid crystal display device of claim 6, wherein the side face of the second step extends in the second direction.

9. The liquid crystal display device of claim 2, wherein the first substrate includes a plurality of gate lines extending in the first direction, a plurality of source lines extending in the second direction crossing the first direction, a plurality of switching elements placed in the vicinity of the crossings of the plurality of gate lines and the plurality of source lines, and a plurality of pixel electrodes electrically connected with the plurality of gate lines and the plurality of source lines via the plurality of switching elements, at least one of the plurality of first twist-aligned regions is formed above at least one of the plurality of gate lines, at least one of the plurality of second twist-aligned regions is formed above at least one of the plurality of source lines, and at least one of the plurality of first splay-aligned regions is formed above at least one of the plurality of pixel electrodes.

10. The liquid crystal display device of claim 9, wherein the first substrate further includes a plurality of common lines each formed between the adjacent ones of the plurality of gate lines, and at least one of the plurality of first twist-aligned regions is formed above at least one of the plurality of common lines.

11. The liquid crystal display device of claim 2, wherein at least one of the plurality of second twist-aligned regions is formed continuously from at least one of the plurality of first twist-aligned regions.

12. The liquid crystal display device of claim 11, wherein the spacing between two second twist-aligned regions adjacent in the first direction among the plurality of second twist-aligned regions is 1 mm or less.

13. The liquid crystal display device of claim 1, wherein the pretilt direction of liquid crystal molecules of the liquid crystal layer is parallel to the first direction.

14. A liquid crystal display device comprising:

a first substrate, a second substrate placed to face the first substrate, and a liquid crystal layer interposed between the first and second substrates, the liquid crystal layer containing a chiral dopant, wherein the liquid crystal layer includes: a twist-aligned region exhibiting 180-degree twisted alignment during non-voltage application; and a splay-aligned region exhibiting splay alignment during non-voltage application and bend alignment during voltage application, to be used for display, at least one of the first substrate and the second substrate has a plurality of steps on the surface facing the liquid crystal layer, each having an upper face, a lower face, and a side face connecting the upper face and the lower face, the splay-aligned region is formed above the upper faces of the plurality of steps, and the twist-aligned region is formed above the lower faces of the plurality of steps, and the plurality of steps include a first step and a second step, the side face of the first step has an angle exceeding 90° with respect to the lower face, and the side face of the second step has an angle less than 90° with respect to the lower face, so that the side face of the second step, but not the first step, is characterized by a top portion thereof overhanging a lower portion thereof so that the side face of the second step defines a recess which is located in an area where the upper face of the second step overhangs the lower portion of the second step.

* * * * *